US012522424B2

(12) United States Patent
Keating et al.

(10) Patent No.: US 12,522,424 B2
(45) Date of Patent: Jan. 13, 2026

(54) SYSTEMS AND METHOD OF USE FOR DISPENSING LIQUIDS FROM A CONTAINER

(71) Applicant: Berg Company, LLC, Monona, WI (US)

(72) Inventors: Michael J. Keating, Hardwick, NJ (US); Donald R. Lamond, Haworth, NJ (US); Ronald F. Faust, Cross Plains, WI (US); Thomas E. Giles, Orfordville, WI (US); Albert H. Dorsey, Ocean Grove, NJ (US)

(73) Assignee: BERG LIQUOR SYSTEMS, LLC, Monona, WI (US)

( * ) Notice: Subject to any disclaimer, the term of this patent is extended or adjusted under 35 U.S.C. 154(b) by 0 days.

(21) Appl. No.: 18/225,317

(22) Filed: Jul. 24, 2023

(65) Prior Publication Data

US 2024/0132274 A1 Apr. 25, 2024

Related U.S. Application Data

(63) Continuation of application No. 16/222,390, filed on Dec. 17, 2018, now Pat. No. 11,708,211, which is a (Continued)

(51) Int. Cl.
*B65D 47/06* (2006.01)
*B65D 47/24* (2006.01)
(Continued)

(52) U.S. Cl.
CPC ............. *B65D 83/53* (2025.01); *B65D 47/06* (2013.01); *B65D 47/248* (2013.01);
(Continued)

(58) Field of Classification Search
CPC .... B65D 83/525; B65D 83/543; B65D 47/06; B65D 47/248; B67D 3/0003; B67D 3/0041; B67D 3/0077; B67D 3/0045
See application file for complete search history.

(56) References Cited

U.S. PATENT DOCUMENTS 2,554,570 A 5/1951 Harvey
3,920,149 A 11/1975 Fortino et al.
(Continued)

FOREIGN PATENT DOCUMENTS

CA 2668642 A1 5/2008
CN 101547856 A 9/2009
(Continued)

OTHER PUBLICATIONS

International Search Report and Written Opinion for PCT/US2014/019930, mailing date Aug. 15, 2014, 12 pages.
(Continued)

*Primary Examiner* — Frederick C Nicolas
(74) *Attorney, Agent, or Firm* — Winthrop & Weinstine, PA

(57) ABSTRACT

A method for dispensing a beverage from a bottle that includes communicating a dispensing authorization message from a control unit to at least one of a server interface carried by a beverage server and a pour spout secured to a bottle, wherein the dispensing authorization message at least one of includes or initiates a dispensing command, and wherein the pour spout responds to the dispensing command by opening a spout valve through which a beverage flows from the bottle and out of the pour spout.

20 Claims, 11 Drawing Sheets

Related U.S. Application Data continuation of application No. 14/221,679, filed on Mar. 21, 2014, now Pat. No. 10,155,651, which is a continuation-in-part of application No. 13/799,649, filed on Mar. 13, 2013, now Pat. No. 9,212,041.

(51) Int. Cl.

| | |
|---|---|
| ***B65D 83/52*** | (2025.01) |
| ***B65D 83/53*** | (2025.01) |
| ***B65D 83/54*** | (2006.01) |
| ***B67D 3/00*** | (2006.01) |

(52) U.S. Cl.

CPC ......... *B65D 83/543* (2013.01); *B67D 3/0003* (2013.01); *B67D 3/0041* (2013.01); *B67D 3/0045* (2013.01); *B67D 3/0077* (2013.01)

(56) References Cited

U.S. PATENT DOCUMENTS

| | | | | | |
|---|---|---|---|---|---|
| 5,275,309 | A | | 1/1994 | Baron et al. | |
| 5,318,197 | A | | 6/1994 | Martindale et al. | |
| 5,379,916 | A | | 1/1995 | Martindale et al. | |
| 5,567,131 | A | | 10/1996 | McNaull | |
| 5,603,430 | A | | 2/1997 | Loehrke et al. | |
| 5,702,032 | A | * | 12/1997 | Loehrke | B67D 3/0006 222/63 |
| 5,731,981 | A | | 3/1998 | Simard | |
| 5,839,483 | A | | 11/1998 | Rejret et al. | |
| 6,036,055 | A | | 3/2000 | Mogadam et al. | |
| 6,328,277 | B1 | | 12/2001 | Hanada | |
| 7,004,358 | B2 | | 2/2006 | Ogawa | |
| 7,651,015 | B2 | | 1/2010 | Girard et al. | |
| 7,900,799 | B2 | | 3/2011 | Kuzar et al. | |
| 8,196,781 | B2 | | 6/2012 | Greenwald et al. | |
| 9,004,320 | B2 | | 4/2015 | Keating et al. | |
| 9,022,257 | B2 | | 5/2015 | Keating et al. | |
| 9,212,041 | B2 | | 12/2015 | Keating et al. | |
| 9,718,665 | B2 | * | 8/2017 | Wittrup | B67D 3/0051 |
| 9,975,752 | B2 | | 5/2018 | Keating et al. | |
| 10,155,651 | B2 | | 12/2018 | Keating et al. | |
| 11,708,211 | B2 | * | 7/2023 | Keating | B65D 47/248 222/54 |
| 2005/0197738 | A1 | | 9/2005 | Morrison et al. | |
| 2008/0195251 | A1 | | 8/2008 | Milner | |
| 2009/0230157 | A1 | | 9/2009 | Lindberg | |
| 2010/0038378 | A1 | | 2/2010 | Gabler et al. | |
| 2011/0180563 | A1 | | 7/2011 | Fitchett et al. | |
| 2012/0138836 | A1 | | 6/2012 | Kanai | |
| 2012/0158173 | A1 | | 6/2012 | Metropulos et al. | |
| 2012/0211516 | A1 | | 8/2012 | Zapp et al. | |
| 2012/0223096 | A1 | | 9/2012 | Rudick | |
| 2013/0085599 | A1 | | 4/2013 | Nicol et al. | |
| 2014/0263418 | A1 | | 9/2014 | Keating et al. | |
| 2014/0263430 | A1 | | 9/2014 | Keating et al. | |
| 2014/0312060 | A1 | | 10/2014 | Heatherly et al. | |
| 2018/0265344 | A1 | | 9/2018 | Keating et al. | |

FOREIGN PATENT DOCUMENTS

| | | | |
|---|---|---|---|
| EP | 2091858 | B1 | 1/2011 |
| WO | 2008055929 | A1 | 5/2008 |

OTHER PUBLICATIONS

U.S. Office Action dated Apr. 24, 2014 for U.S. Appl. No. 13/799,917, 8 pages.

* cited by examiner

DIRECT POUR MODE

COCKTAIL MODE

SYSTEMS AND METHOD OF USE FOR DISPENSING LIQUIDS FROM A CONTAINER

CROSS-REFERENCE TO RELATED APPLICATIONS

This present disclosure is a continuation of U.S. patent application Ser. No. 16/222,390, entitled "System and Method of Use for Dispensing Liquids from a Container," filed on Dec. 17, 2018, which is a continuation application of U.S. patent application Ser. No. 14/221,679 entitled "System and Method of Use for Dispensing Liquids from a Container," filed Mar. 21, 2014 and issued as U.S. Pat. No. 10,155,651, which is a continuation-in-part of U.S. patent application Ser. No. 13/799,649 entitled "Wireless Control System for Dispensing Beverages from a Bottle," filed on Mar. 13, 2013 and issued as U.S. Pat. No. 9,212,041, both of which are hereby incorporated by reference herein in their entirety.

FIELD OF THE DISCLOSURE

An embodiment of the invention relates to a system and method of use for dispensing liquids from a container, and in some embodiments, to a dispensing system that controls the dispersion of a beverage that flows from a bottle.

BACKGROUND OF THE DISCLOSURE

A bartender commonly pours liquor from a bottle into a glass in which a drink is being prepared. A spout is often attached to the mouth of the bottle to dispense the liquor at a relatively constant flow rate so that a bartender can "free pour" the liquor without the need for a measuring device, such as a jigger. Even at a constant flow rate, the exact amount of liquor poured into each drink varies among different bartenders, and also varies from drink to drink poured by the same bartender. Variables such as "pouring angle" (angle of a bottle relative to vertical when dispensing its contents); the volume of liquor remaining in a bottle; and the temperature of the liquor, can each be a factor in the attempt to achieve a constant flow rate. These variables can affect the profits derived from a given bottle of liquor; as well as affecting the taste, and as such the quality, of a mixed drink. In addition, simple bottle spouts do not provide a mechanism to ensure that each drink dispensed from a bottle is properly accounted for. Thus, a bartender may provide free or generous drinks to friends and preferred customers without accounting to the tavern management. In response to these conditions, taverns and restaurants have installed systems for dispensing liquor to provide some accountability, although such prior systems include numerous limitations that discourage their implementation, functional usage, and accuracy.

SUMMARY OF THE DISCLOSURE

A system for dispensing a beverage from a bottle comprises a pour spout adapted to be attached to the bottle, a server interface adapted to be carried by a person who serves beverages, and a control unit for wirelessly communicating with the server interface and pour spout, as well as a Point of Sale (POS) terminal via a hard wired or wireless connection. The POS terminal records the domestic currency sale(s) amount(s) to allow dispensed liquor income to be logged and archived. The pour spout includes a first transceiver for wireless communication, a controller connected to the first transceiver, and a valve operable by the controller for controlling flow of the beverage from the bottle in response to a first message received by the first transceiver. The server interface has a second transceiver for wirelessly transmitting the first message to the first transceiver and optionally for wireless communication with the control unit, which communication may also be done via the first transceiver. Throughout this document, whenever and wherever a reference is made to a wireless communication between the server interface and the control unit it shall be understood that the same may alternatively be accomplished via a wireless communication between the pour spout and the control unit.

In one dispensing mode, motion denoting a desire to dispense the beverage from the bottle is detected. In response to that motion, the pour spout wirelessly transmits a spout identifier to the server interface, which responds by either wirelessly transmitting a request message to a stationary control unit, or by wirelessly transmitting a size selection message to the pour spout which in turn transmits the request message to the control unit. The request message contains a server identifier, which is unique to that server interface, the spout identifier, and the selected size. The control unit responds to the request message by wirelessly transmitting to the server interface, or to the pour spout, a reply message, hereafter known as a dispensing command, authorizing beverage dispensing and containing the volume of liquid to dispense. If the dispensing command was sent to the server interface, it reacts to the reply message by wirelessly transmitting the dispensing command to the pour spout. The dispensing command causes the pour spout to open its valve enabling the specified volume of the beverage to flow from the bottle.

In another dispensing mode, the person selects a cocktail via a user input device which causes a designation of a plurality of liquor ingredients for that cocktail to be retrieved from an electronic memory. The designation of the plurality of liquor ingredients is transmitted wirelessly from the control unit to the server interface carried by the person, or to the plurality of pour spouts required to fulfill the cocktail selection, or it is simply maintained within the control unit as it prepares to respond to legitimate pour requests (requests to pour an ingredient of the cocktail) with the appropriate ingredient volume. Each request to pour an ingredient of the cocktail is can be generated when a motion denoting a desire to dispense the beverage from the bottle is detected. The sequence described in the previous section is thus initiated with the exception that no size selection information is included.

In one aspect of the present invention, the dispensing command designates a nominal pour time interval; and the pour spout opens the valve for a period of time that is derived from the nominal pour time interval. For example, the pour spout senses at least one of a temperature related to the beverage, a bottle tilt angle and a volume remaining in the bottle. That data is employed to derive an adjusted pour time interval from the nominal pour time interval. The valve then is opened for the adjusted pour time interval.

A pour spout is provided for dispensing a beverage from a bottle that has a mouth. The pour spout comprises a bottle adapter for attaching to the bottle to receive the beverage therefrom. The pour spout includes a pour spout housing with a chamber into which a housing inlet and a housing outlet open with the housing inlet being connected to the bottle adapter for receiving beverage from the bottle. A valve carriage is moveably received within the housing chamber and has a carriage flow passage. A resilient first tube provides a first passageway for beverage to flow from the housing inlet to the carriage flow passage and a resilient second tube provides a second passageway for beverage to flow from carriage flow passage to the housing outlet. A valve is operatively connected to control flow of the beverage through the housing from the housing inlet to the housing outlet. A valve actuator is provided to move valve carriage within the chamber, thereby operating the valve.

BRIEF DESCRIPTION OF THE DRAWINGS

Embodiments of the system and method are disclosed with reference to the accompanying drawings and are for illustrative purposes only. The system and method are not limited in their application to the details of construction or the arrangement of the components illustrated in the drawings. The system and method are capable of other embodiments or of being practiced or carried out in other various ways. In the drawings.

DETAILED DESCRIPTION OF THE DISCLOSURE

Figure 1:
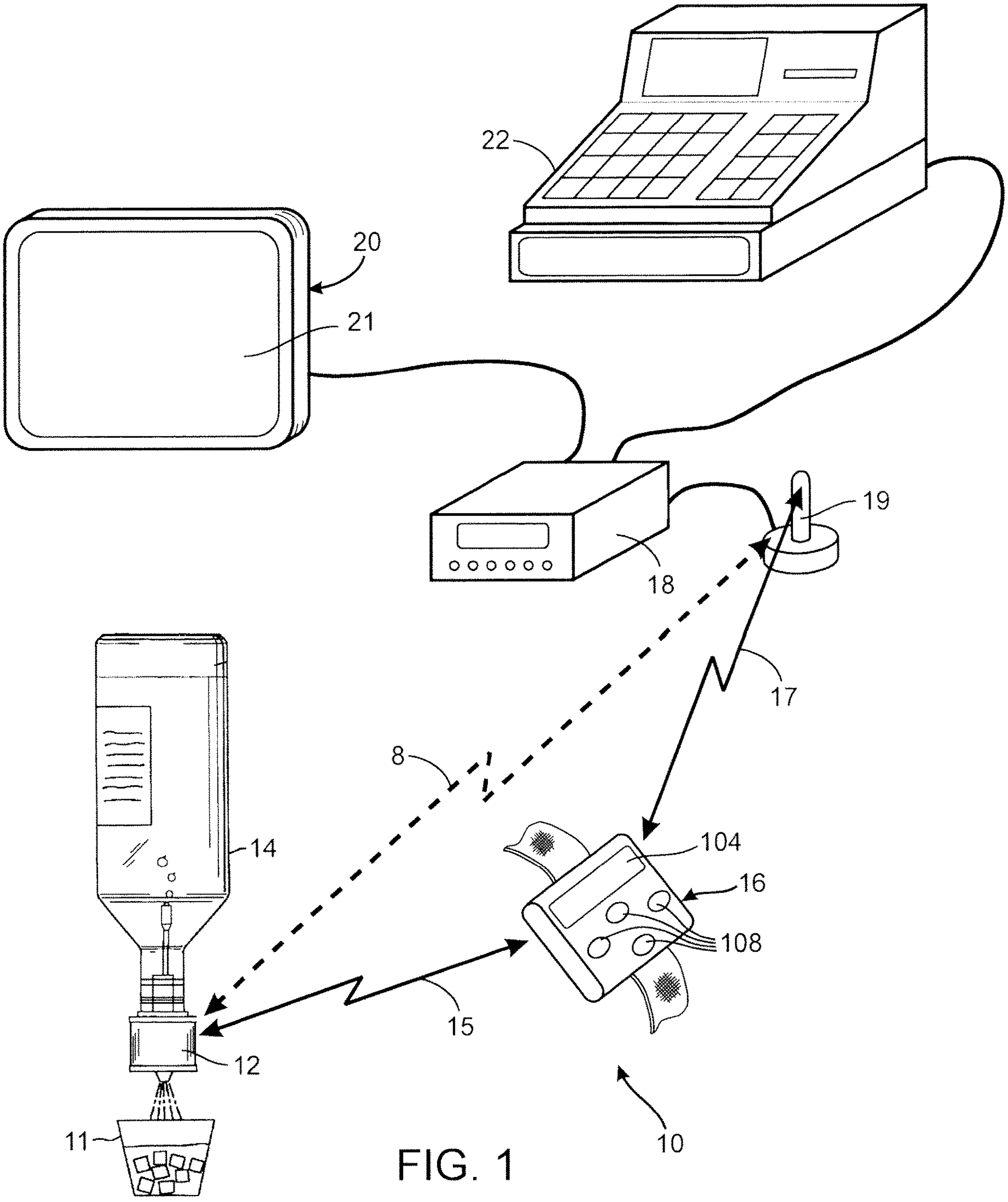
FIG. 1 is a diagram of an exemplary beverage dispensing system.

References herein to directional relationships and movement, such as top and bottom or left and right, refer to the relationship and movement of the components in the orientation illustrated in the drawings, which may not be the orientation of those components in all situations. In at least some embodiments, the term “directly connected” as used herein means that the associated components are connected together by a conduit without any intervening element, such as a valve, an orifice or other device, which may restrict or control the flow of fluid beyond the inherent restriction of any conduit.

With initial reference to FIG. 1, an exemplary beverage dispensing system 10 is illustrated that includes a pour spout 12 that is securely inserted into the neck of a bottle 14 that contains a beverage, such as liquor, to be dispensed. Although only one bottle and pour spout are shown, it should be understood that a typical tavern, restaurant, or similar facility, may have a plurality of bottles, each having a similar or dissimilar pour spout. As will be described in greater detail, and in at least some embodiments, the pour spout 12 is controlled by messages received via a bidirectional first radio frequency link 15 from a server interface 16 that is carried by each person who is authorized to dispense beverages from the bottles, and/or via a bidirectional first radio frequency link 8 from a control unit 18. That person is referred to herein as a “beverage server” and the server interface 16 is used by the system to identify which beverage server is dispensing liquor from a bottle. The server interface 16 in the illustrated embodiment of the dispensing system 10 is shown in the form of a bracelet that has a wrist strap for fastening the device on the forearm of the beverage server. Nevertheless, other forms of the server interface, such as one that fits in a shirt pocket, may be provided which are adapted to enable the beverage server to carry the server interface while performing drink dispensing duties. In at least some embodiments, the server interface 16 also communicates via a bidirectional second radio frequency link 17 with a control unit 18 (“Base Station”) that governs the dispensing of the beverages. Further, in at least some embodiments, the pour spout 12 and the control unit 18 may communicate with each other, at least one of directly or indirectly.

The control unit 18 is in at least some embodiments, physically similar to control computers used in previous beverage dispensing systems, except that it communicates with the server interface 16, and/or the pour spout 12, via an internal radio transceiver connected to an antenna 19 (e.g., an internal or external antenna), in order to dispense a beverage from the bottles 14. In other embodiments, the control unit 18 can include one or more of various features not available in previous beverage dispensing systems. In addition, in at least some embodiments, the control unit 18 includes a microcontroller (i.e., embedded processor), such as a part number nRF51422 Radio Frequency System On a Chip (RF SOC), as manufactured by Nordic Semiconductor of Oslo, Norway; one or more memory storage devices, such as flash memory for control program storage, a RAM memory for housekeeping, temporary storage of variables, calculation workspace, etc., and a serial EEPROM memory for archival storage, etc.; one or more communication transceivers, such as an ISM Band 2400-2800 MHz transceiver, which can be integral to the microcontroller (e.g., nRF51422 RF SOC), the transceiver being capable of communicating with numerous other components and over one or more of various network configurations, such as a multicast wireless sensor network, for example the ANT+ network protocol as developed by Dynastream Innovations, Inc. of Alberta, Canada. In addition, the communication transceivers can include a Bluetooth capable transceiver and a Wi-Fi capable transceiver.

As will be described, the control unit 18 executes various functions of the present dispensing system 10. In at least some embodiments, the control unit 18 is in communication with a cocktail pad 20 by which the beverage servers may select particular types of drinks to be served and the specific type of alcohol for each of the drinks. The connection between the control unit 18 and the cocktail pad 20 can be achieved in numerous manners, such as wired and/or wireless connections. The server interface 16, control unit 18, pour spout 12, and the cocktail pad 20, are in at least some embodiments, capable of communicating with each other, using one or more of various communication protocols, such as Bluetooth, ANT+, WiFi, GAZELL™, ISM Band 902928 MHz, etc.

In at least some embodiments, the cocktail pad 20 is a computer implemented device that stores a repertoire of cocktails and other mixed drinks along with the liquor ingredients for each cocktail and mixed drink. In at least some embodiments, the cocktail pad 20 includes a memory device (not shown), a processor (not shown), and a user interface, such as a touch screen 21 (e.g., a resistive or capacitive LCD touch screen) (e.g., Graphical User Interface (GUI)), by which a beverage server accesses the drink repertoire and selects a particular drink to be served. In at least some embodiments, the cocktail pad 20 is a commercially available device, such as part number 8003472, as manufactured by the Berg Company of Monona, Wisconsin, U.S.A., although in other embodiments the cocktail pad 20 can be in the form of a smartphone or tablet, such as an 'PHONE or IPAD, with a suitable application configured to provide a graphical user interface and to communicate with other components of the dispensing system 10. In at least some embodiments, the cocktail pad 20 may be in whole or in part, integral with the control unit 18. The control unit 18 also may be connected to, or otherwise in communication with, a point of sale unit (e.g., a cash register) that is used to tabulate the price to be charged to the customers being served and to collect their payment. The control unit 18 also may be in communication with other devices (via a computer network or other communication network) such as a central computer that monitors the food and beverage service at the particular tavern or restaurant. It should be further understood that in a large establishment, there may be multiple beverage dispensing systems 10 connected together via that communication network, or several control units 18 may be connected together by another communication network.

Figure 3:
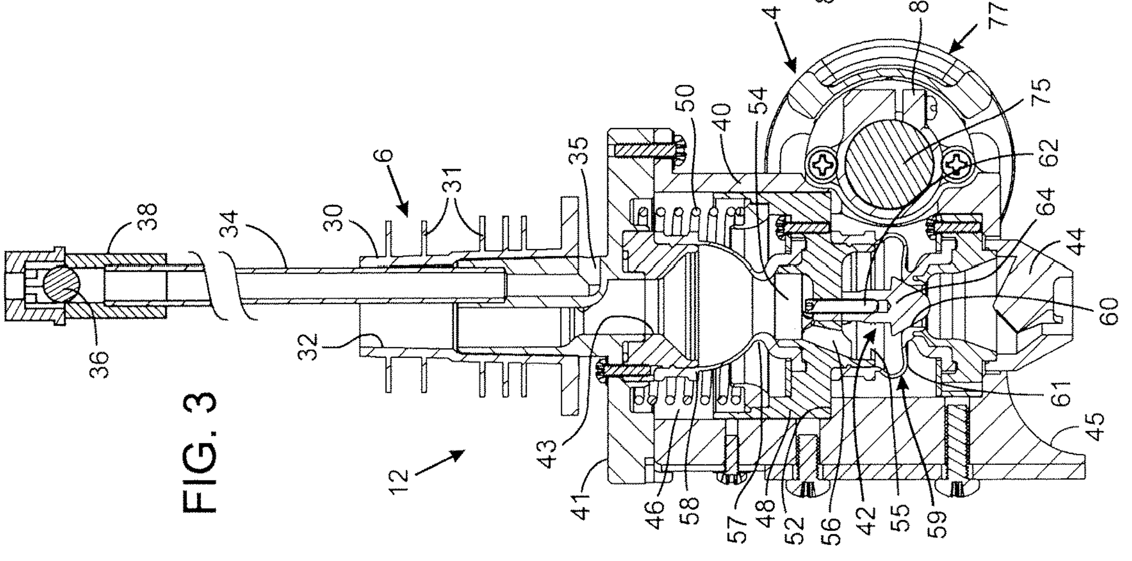
FIG. 3 is a transverse cross sectional view through the pour spout in a closed state, as taken along line 3-3 of FIG. 2.
Figure 2:
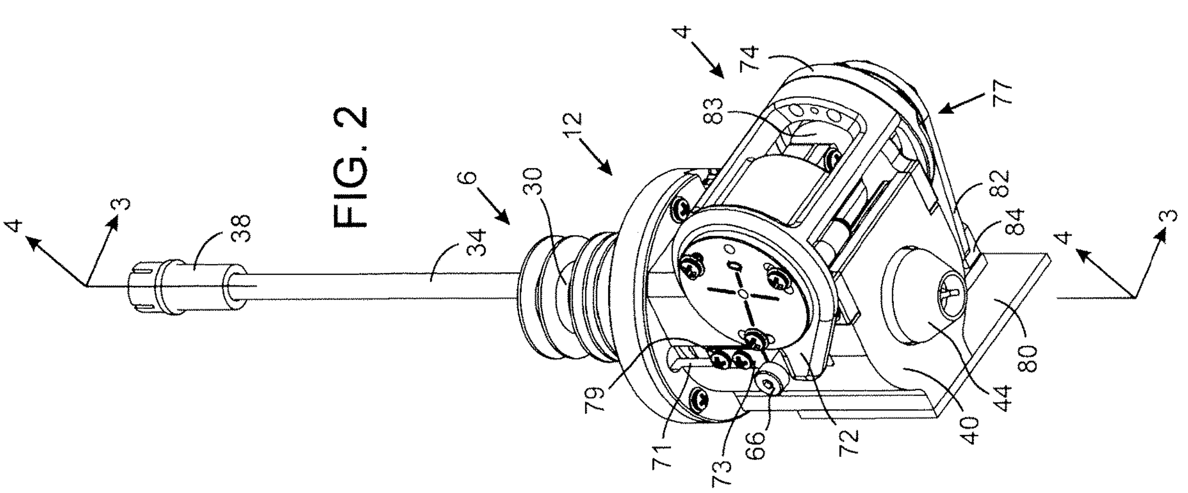
FIG. 2 is a perspective view of an exemplary pour spout used in at least one embodiment of the beverage dispensing system.
Figure 12:
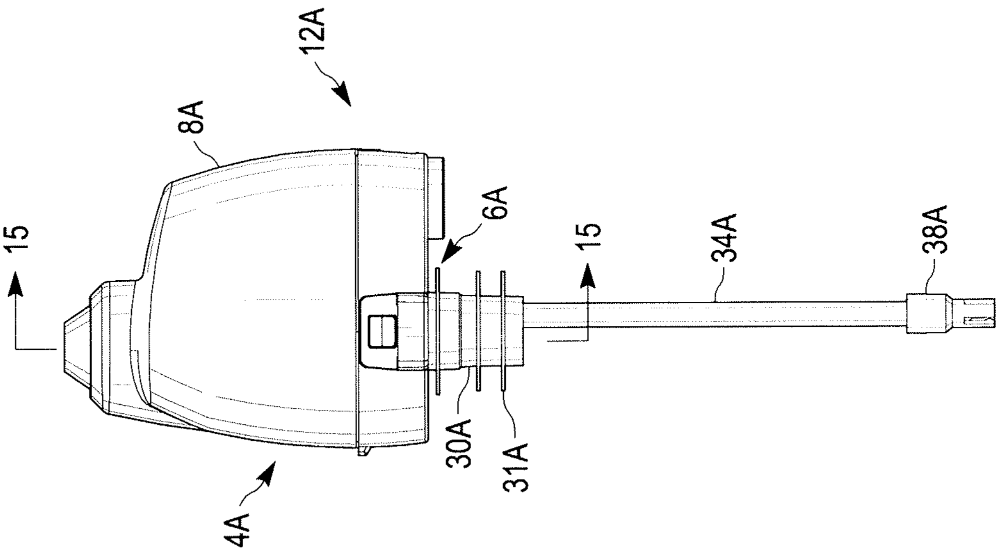
FIG. 12 is a side view of the pour spout of FIG. 10.
Figure 11:
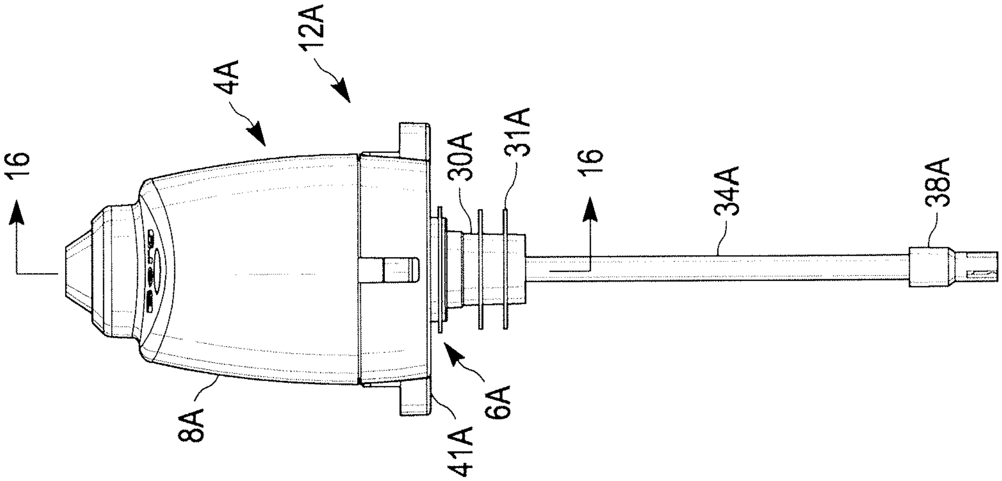
FIG. 11 is a rear view of the pour spout of FIG. 10.
Figure 10:
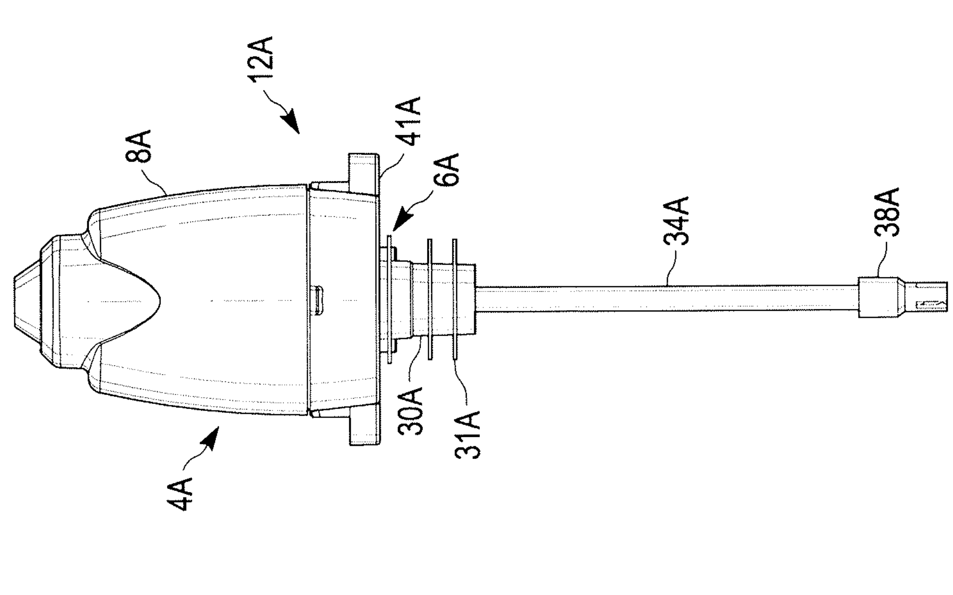
FIG. 10 is a front view of another exemplary pour spout used in at least one embodiment of the beverage dispensing system.
Figure 13:
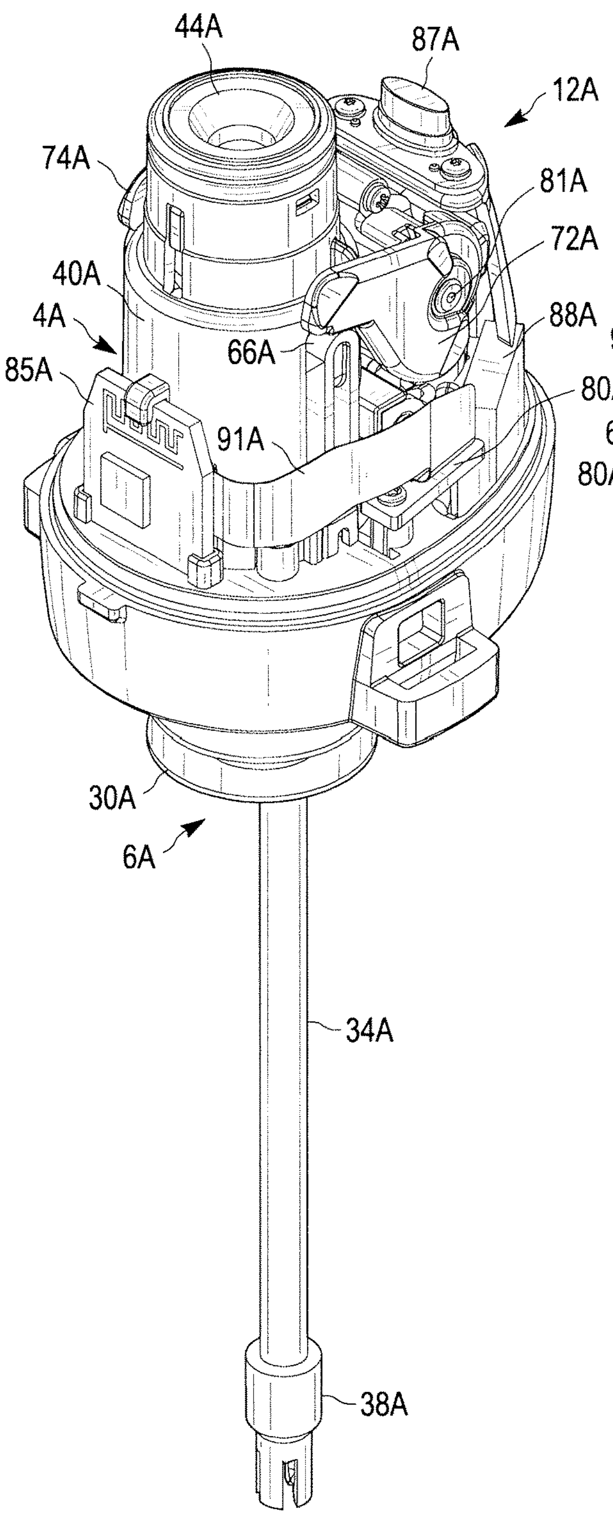
FIG. 13 is a front perspective view of the pour spout of FIG. 10 with a top cover removed.
Figure 14:
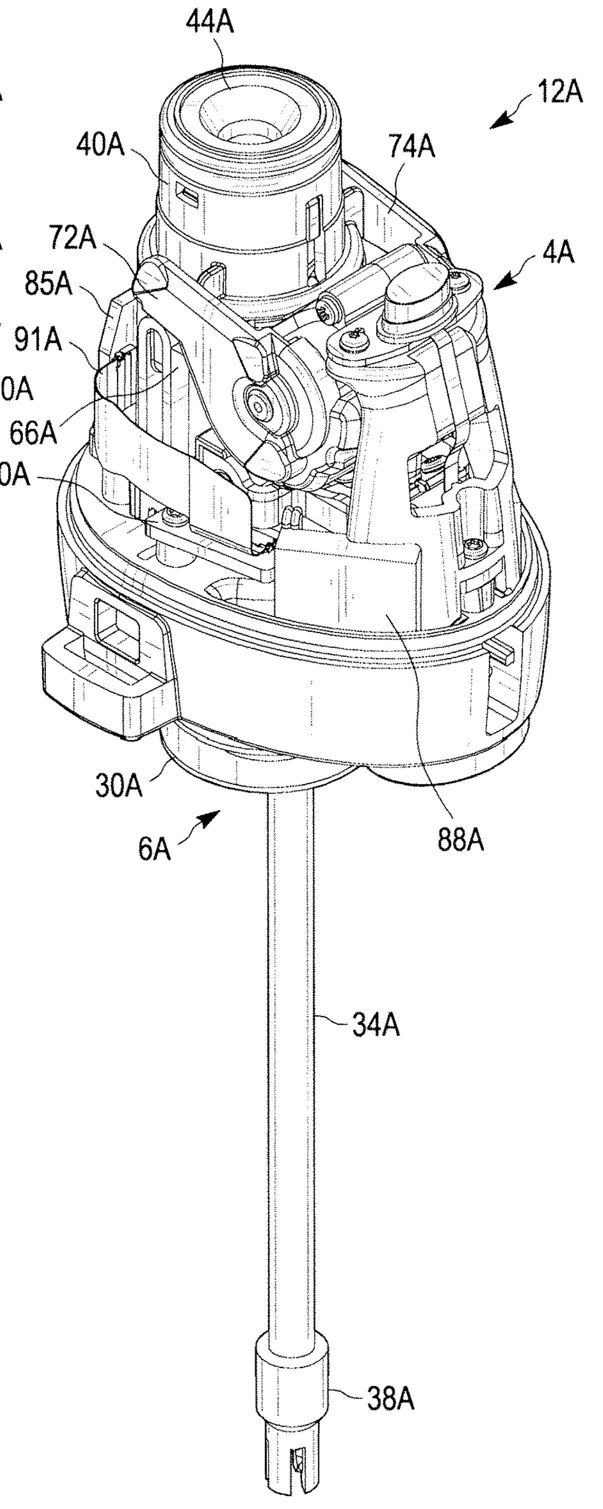
FIG. 14 is a rear perspective view of the pour spout of FIG. 10 with the top cover removed.
Figure 15:
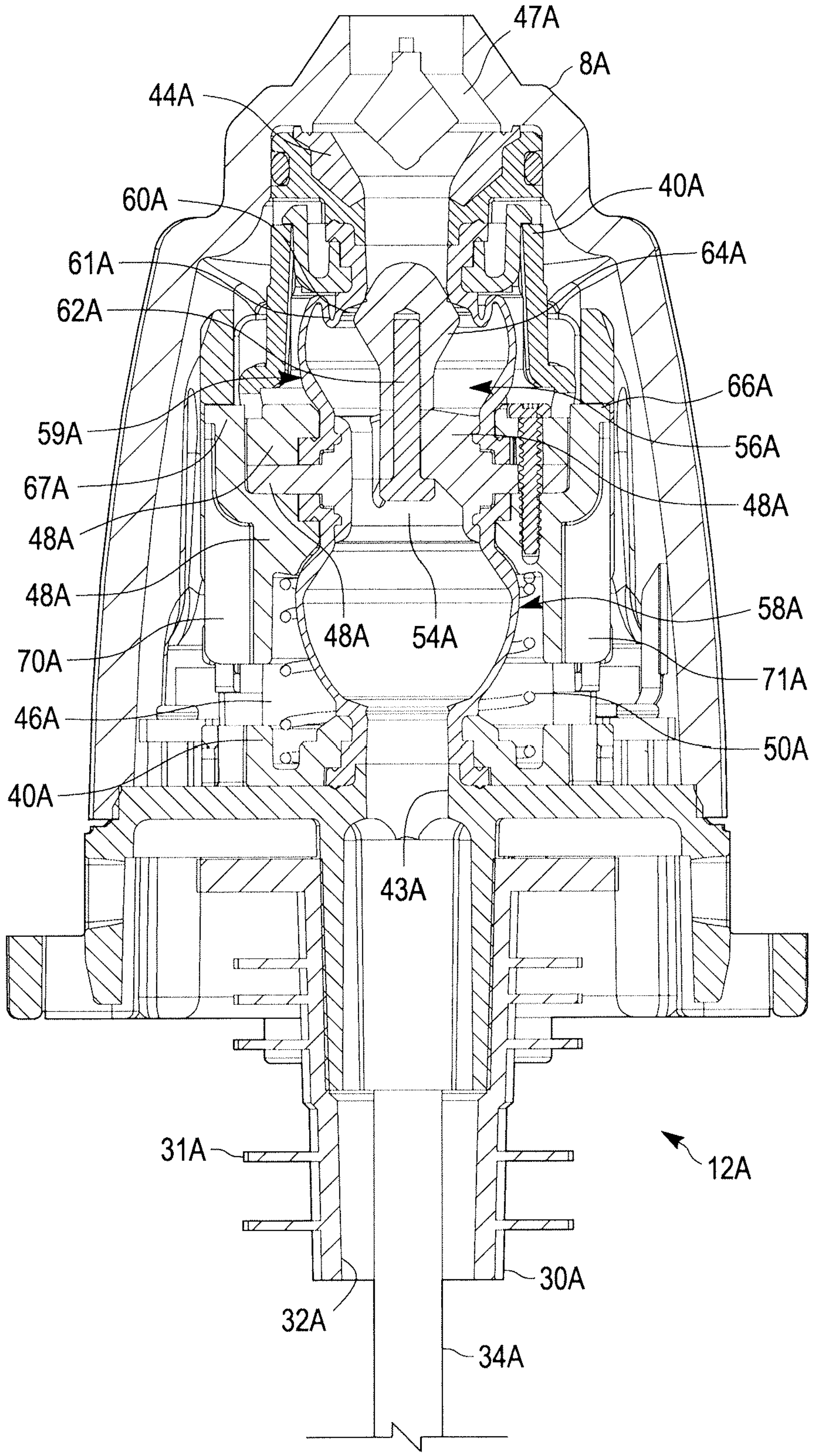
FIG. 15 is a transverse cross sectional view through the pour spout, as taken along line 15-15 of FIG. 12 with a valve in a closed position.

FIGS. 2-3 illustrate the exemplary pour spout 12 with a top cover 8A (see for example, FIGS. 10-12) removed so that the interior details of the device are visible. The pour spout 12 includes a pour spout upper portion 4 that is secured to or otherwise formed therewith a pour spout lower portion 6. In at least some embodiments, the pour spout lower portion 6 is configured to interface directly with the bottle 14 and the pour spout upper portion 4 is configured to house various components for dispensing and communication, as discussed below. In at least some embodiments, the pour spout 12 includes a bottle adapter 30 that when inserted into the neck 13 of the bottle 14 provides a liquid tight seal that prevents liquid from escaping the bottle 14 unless the pour spout is activated. The bottle adapter 30 may be made of plastic and/or other materials, and in at least some embodiments, includes a plurality of rings 31 having different outer diameters to accommodate (e.g., fit tightly) bottle necks of different sizes, however, the bottle adapter can have other configurations. The bottle adapter 30 has an inner beverage passage 32 through which the beverage in the bottle 14 enters the pour spout. A breather tube 34 with an air inlet 35 allows air to flow into the bottle to replace the liquid which flows out through the pour spout 12. In at least some embodiments, a ball 36 held within a cage 38 forms a check valve at the distal end of the breather tube 34 to prevent liquid from entering the breather tube when the bottle is inverted.

A tamper-indicator, such as a heat shrink seal, an adhesive backed paper label or tape, etc. (not shown), may be placed around the pour spout 12 and a neck 13 of the bottle 14 to detect and provide a visual indication of unauthorized attempts to remove the pour spout from the bottle. In at least some embodiments, the tamper-indicator can be secured to the neck 13 and a feature and/or accessory component that is affixed to the pour spout 12.

Alternatively, a sensor in the form of a mechanical switch, an optical transmitter and reflector, a bottle to pourer proximity sensor, or other mechanisms known in the art could be used for indicating, logging, or communicating events of tampering with the integrity of the bottle to pourer bond. As a consequence, in at least some embodiments, the only way to pour liquid from the bottle without providing indication to management of tampering is to use the dispensing system 10.

The pour spout 12 has an interior housing 40 with a first side 41 to which the bottle adapter 30 is attached. That first side 41 has a housing inlet 43 through which liquid from the bottle is received from the inner beverage passage 32. The opposite second side 45 of the housing 40 has a nozzle 44 with a housing outlet 47 through which the beverage is dispensed from the pour spout 12. A spout valve 42 is provided within the housing 40 to control the flow of the beverage through the pour spout. The spout valve 42 is located in a chamber 46 within the housing 40 and comprises a valve carriage 48 that slides within the chamber toward and away from the housing inlet 43. A biasing element, such as a compression spring 50, biases the valve carriage 48 away from the housing inlet 43 and toward a stop 52 located on the housing, or alternatively, an effective stop created when the plunger head 64 contacts the valve seat 60, thereby restricting the travel of the carriage 48. The valve carriage 48 has a carriage inlet 54 and a carriage outlet 55, with a carriage flow passage 56 through which the beverage can flow. A first tube 58 comprised of a flexible, resilient material, such as silicone, has one end sealed in a secured manner to the housing 40 around the housing inlet 43 and another end sealed in a secured manner to the valve carriage 48 around the carriage inlet 54. Thus the first tube 58 provides a first passageway for liquid to flow from the housing inlet 43 into the carriage inlet 54. In at least some embodiments, the first tube 58 has at least one pleat 57 that allows the length of that tube to contract as the valve carriage 48 slides toward the housing inlet 43 while maintaining the first passageway open. In at least some embodiments, a similar second tube 59 is provided that includes one end sealed in a secured manner to the valve carriage 48 around the carriage outlet 55 and another end sealed in a secured manner to the housing 40 around an opening of the housing outlet 47 in the outlet nozzle 44. Thus the second tube 59 can provide a second passageway for liquid to flow from the carriage outlet 55 into the outlet nozzle 44. In at least some embodiments, the second tube 59 also is fabricated from a resilient material, such as silicone, and has at least one pleat 61 that allows the second tube to extend and contract lengthwise while maintaining the second passageway open.

Figure 4:
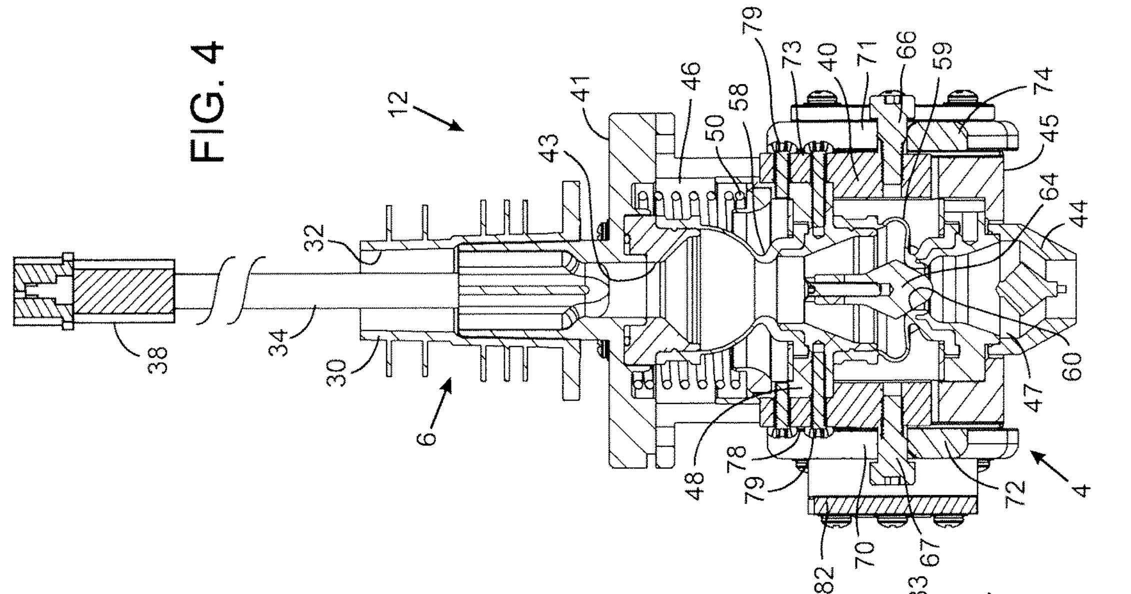
FIG. 4 is a transverse cross sectional view through the pour spout in a plane that is rotated 90° to the cross section plane of FIG. 3, as taken along line 4-4 of FIG. 2.

A valve seat 60 is formed in the interior surface of the second tube 59 adjacent the end that is sealed to the outlet nozzle 44. The valve seat is shaped to provide a conforming seal with a plunger 62, as discussed below. In at least some embodiments, the valve seat 60 is annular. The valve carriage 48 has a plunger 62 extending therefrom toward the outlet nozzle 44. The plunger 62 includes a head 64, which in the closed state of the pour spout 12 (as illustrated in FIGS. 3 and 4) engages the valve seat 60 to prevent liquid flow through the second tube 59. In at least some embodiments, the head 64 is tapered to provide a seal with the valve seat 60. Note that in this closed state, the length of the second tube 59 is contracted because the valve carriage 48 is in a position that is proximate to the outlet nozzle 44. The compression spring 50 biases the valve carriage into that position, thereby forcing the plunger 62 to abut the valve seat 60 and close the spout valve 42. Alternatively, the valve seat 60 could be located around the carriage passage 56, adjacent the carriage outlet 55, and the plunger could be affixed to the valve housing adjacent the outlet nozzle 44. These variations provide a valve seat in a flow path between the valve carriage 48 and the outlet nozzle 44 with the valve seat being engaged by a plunger to close the valve. As a further alternative, the valve seat and plunger could be provided between the valve carriage 48 and the inlet 43 of the housing on the opposite side of the valve carriage. In at least some embodiments, generically, a valve seat and closure plunger of the spout valve 42 are provided in the flow path through the housing 40 between the housing inlet 43 and the outlet nozzle 44.

Figure 5:
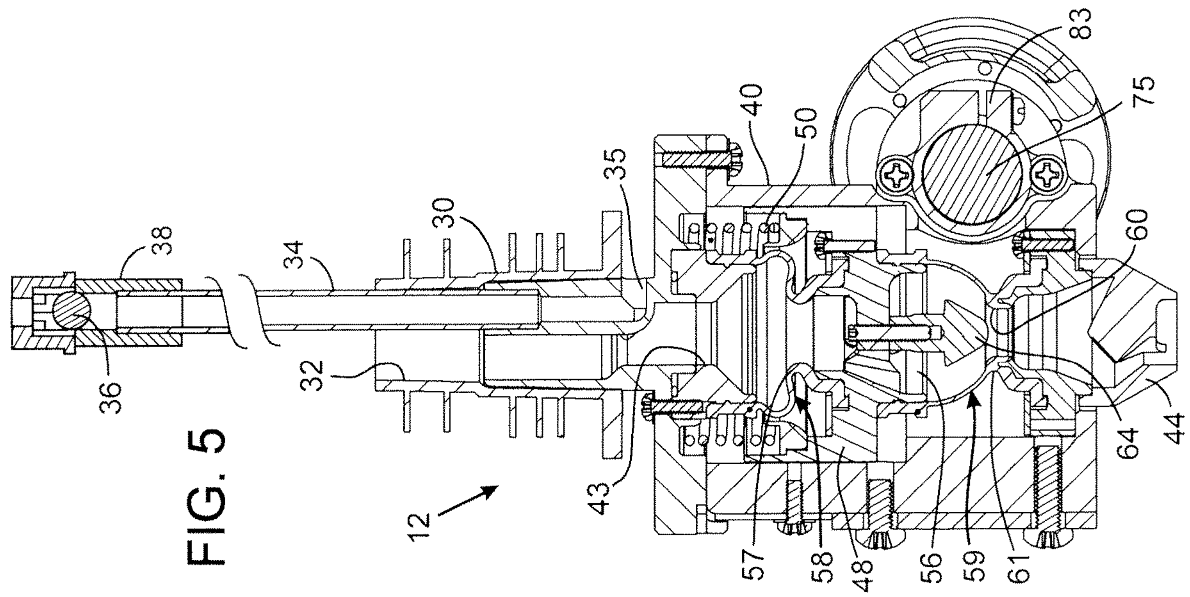
FIG. 5 is a transverse cross sectional view through the pour spout in an opened state.

With reference to FIGS. 3 and 4, a pair of actuating portions 66 and 67, such as machine screws or molded posts, extend from opposite sides of the valve carriage 48 through vertical slots, such as slot 71 (FIG. 2), respectively, in the housing 40. As the actuating portions 66 and 67 travel in the slots, the valve carriage 48 moves within the housing chamber 46 toward and away from housing sides 41 and 45. In at least some embodiments, to assist with the movement of the valve carriage 48 with respect to the slots, a first guide 73 and a second guide 78 can be provided, which are secured to, or formed integrally with (see FIGS. 10-21) the valve carriage 48 to provide a sliding engagement with the slots. In at least some embodiments, the first guide 73 and second guide 78 (FIGS. 2 and 4) are secured to the valve carriage 48 by fasteners, such as screws 79 (as shown in FIGS. 2 and 4). With additional reference to FIG. 2, the actuating portions 66 and 67 are engaged by a pair of cam plates (i.e., lever arms) 72 and 74, respectively. The two cam plates 72 and 74 are rotationally mounted to opposite ends of a shaft 81 (not shown in FIGS. 3 and 4, see 81A in FIGS. 20 and 21) of an electric motor 75. The electric motor 75 and the cam plates 72 and 74 form an electrically operated valve actuator 77. When energized, the motor 75 rotates the shaft 81 and thus the pair of cam plates 72 and 74. As will be described, that rotation pushes the two actuating portions 66 and 67 within the slots 70 and 71, driving the valve carriage 48 against the force of the compression spring 50 and toward the first side 41 of housing 40. That valve carriage motion moves the plunger 62 away from engagement with the valve seat 60, thereby opening the pour spout valve 42. In that position of the valve carriage 48 illustrated in FIG. 5 (and FIG. 17), the first tube 58 becomes longitudinally compressed while the second tube 59 is longitudinally extended. In the open state, liquid is able to flow from the bottle 14 through the beverage passage 32, the first tube 58, the valve carriage 48, the second tube 59 and the outlet nozzle 44 into a glass 11 or other container. Additionally, the motor 75 is affixed to the housing 40 by a clamp 83, this prevents rotation of the motor 75 during actuation of the cam plates 72 and 74.

In at least some embodiments, electrically activated mechanisms other than an electric motor can be used to perform the function of the valve actuator 77. For example, an external solenoid could have an armature that is mechanically coupled to the valve carriage, or the valve carriage can be made of a magnetically permeable material with an electromagnetic coil extending around the exterior of the housing 40 to create a magnetic field that moves the valve carriage 48 to an open state or closed state. In at least some embodiments, other types of spout valves may be used to control the flow of liquid between the housing inlet 43 and the outlet nozzle 44 with the present dispensing system 10. Further, in at least some embodiments, other types of pour spouts 12, such as a pour spout with a transceiver configured to communicate with at least one of the control unit 18, server interface 16, and/or cocktail pad 20 can be interfaced and utilized with the dispensing system 10.

Referring again to FIG. 2, a printed circuit board 80 is attached to the housing 40 and includes one or more electronic circuits (e.g., pour spout control circuit 90, as discussed below) for operating the motor 75 and performing other functions of the pour spout 12 described herein. In addition, one or more additional circuit boards (e.g., circuit board 85A shown in FIG. 16) can be provided that house one or more of various components, such as a first radio receiver 98, as discussed below. The use of multiple circuit boards (e.g., circuit board 80 and 85A) can serve to prevent electrical interference generated from a source of power, such as battery 88A, by distancing the first radio transceiver 98 from the power source. Further, multiple circuit boards can be connected via one or more of various ways, such as using a flex circuit or ribbon cable 91A (see FIGS. 13 and 14).

Figure 16:
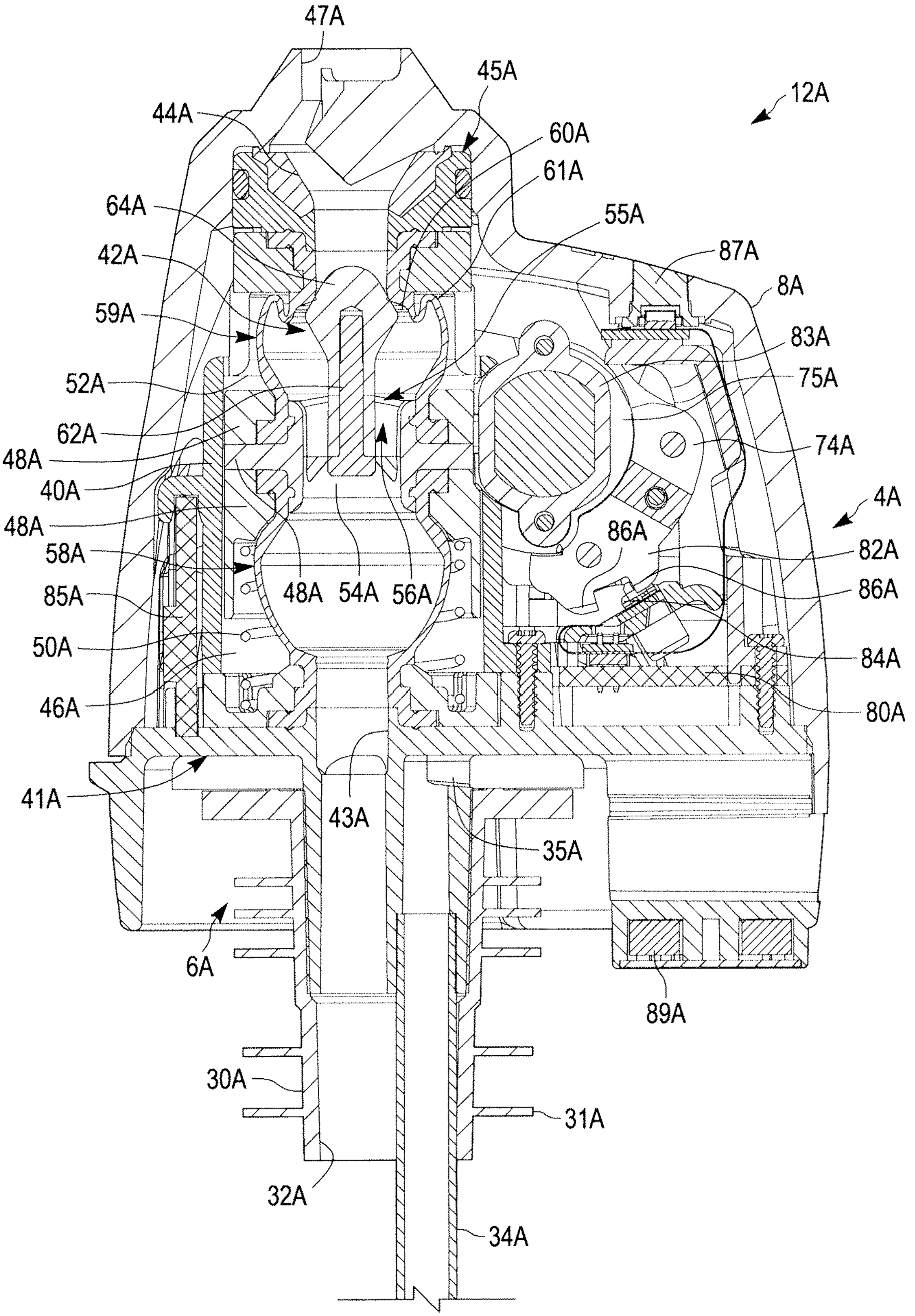
FIG. 16 is a transverse cross sectional view through the pour spout, as taken along line 16-16 of FIG. 11 with the valve in a closed position.
Figure 17:
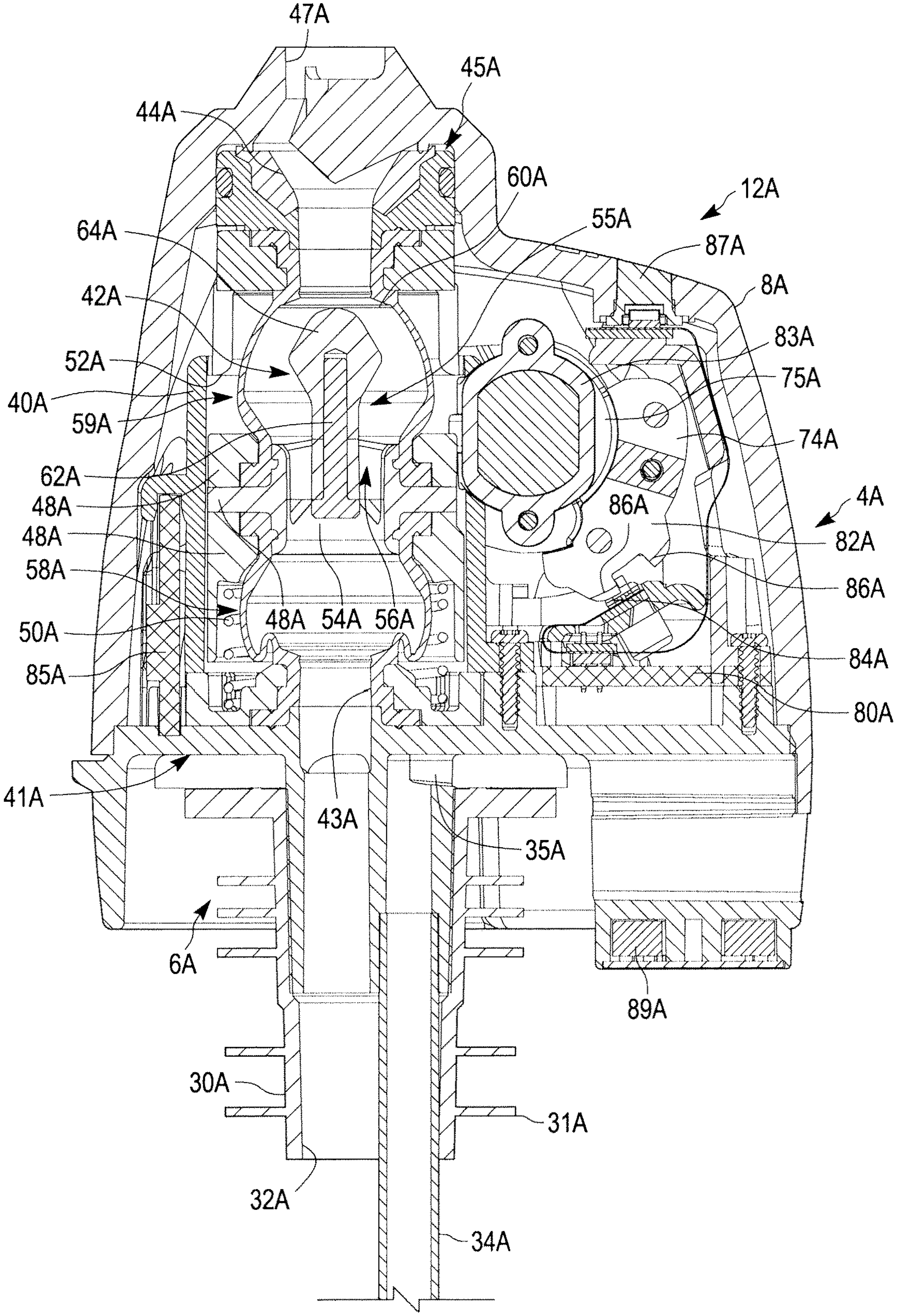
FIG. 17 is a transverse cross sectional view through the pour spout, as taken along line 16-16 of FIG. 11 with the valve in an open position.
Figure 18:
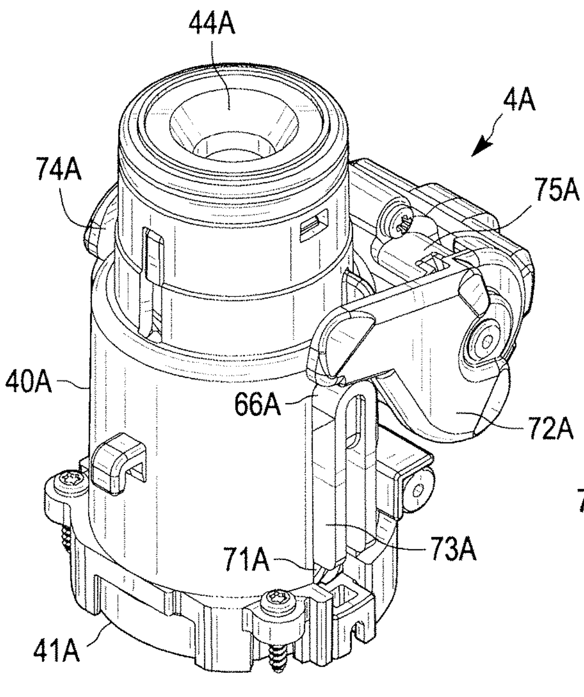
FIG. 18 is a front perspective view of the pour spout upper portion of FIG. 10 with various components removed for clarity.
Figure 19:
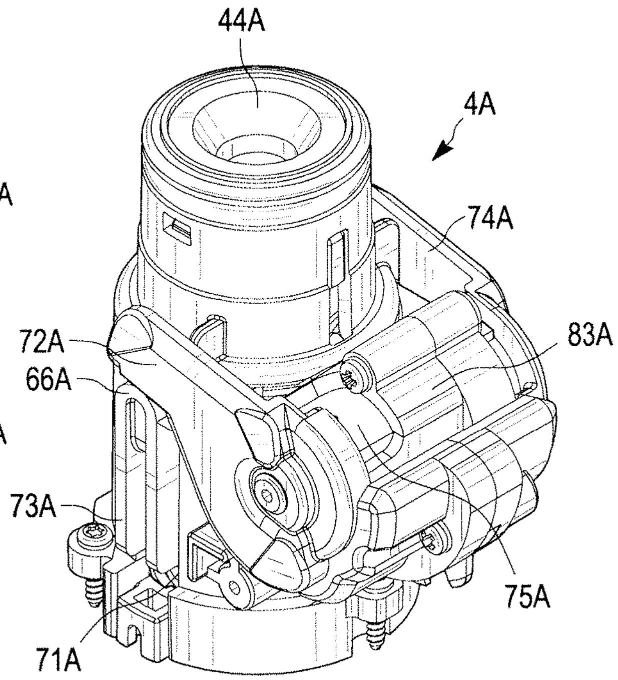
FIG. 19 is a rear perspective view of the pour spout upper portion of FIG. 10 with various components removed for clarity.
Figure 20:
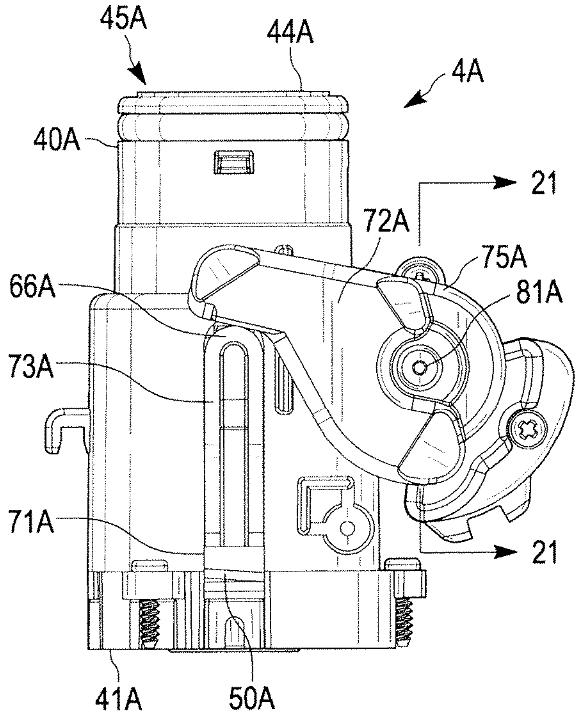
FIG. 20 is a side view of the pour spout upper portion of FIG. 10 with various components removed for clarity.
Figure 21:
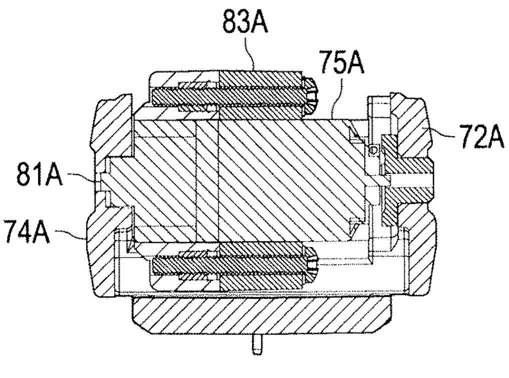
FIG. 21 is a transverse cross view of a portion of the pour spout upper portion of FIG. 20.

In at least some embodiments, a sensor lever 82 is attached to an exposed end of the motor shaft 81 and rotates with the shaft 81, while in other embodiments, the sensor lever 82 can be secured to or integrally formed with one or both of the cam plates 72 and 74. The sensor lever 82 passes through or is otherwise in communication with a valve position sensor 84, such as an electro-optical sensor or photo-interrupter (for example, a part number Rohm RPI-0128, as manufactured by Rohm Semiconductor of San Diego, CA.) that produces an electrical signal having two states indicating whether the pour spout valve 42 is opened (open state) or closed (closed state). In one embodiment sensor lever 82 can be configured to cause photo-interruption when the valve is in the fully open and fully closed position. In another embodiment sensor lever 82 can alternately be configured to cause photo-interruption in the mechanically transitioning position between the valve fully open or fully closed positions. In at least one embodiment, as shown in FIGS. 16, 17, and 20, the sensor lever 82A is attached to the cam plate 74A and is notched to provide a pair of spaced apart tabs 86A, which are sensed by the sensor 84A as the cam plate 74A is actuated.

Figure 6:
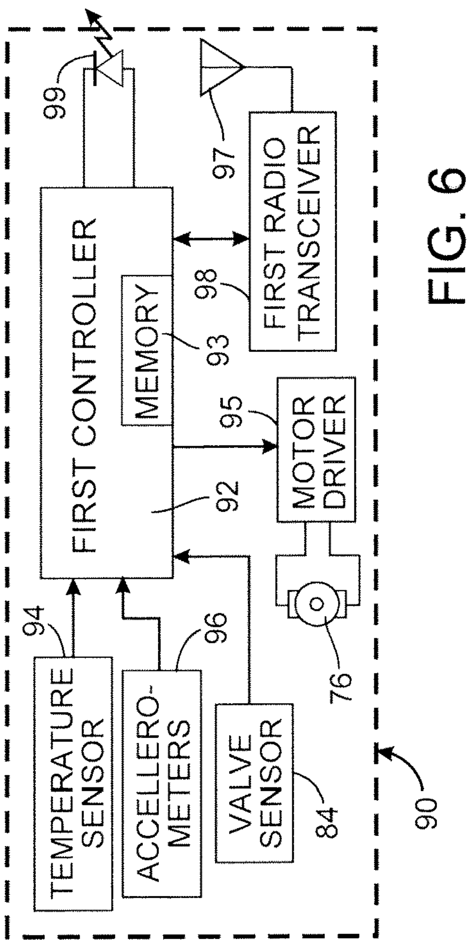
FIG. 6 is an exemplary block schematic diagram of an exemplary control circuit in the pour spout, as taken along line 3-3 of FIG. 2.

FIG. 6 schematically illustrates a pour spout control circuit 90 that is provided, at least in part, on the printed circuit board 80, (some of the various components of the pour spout control circuit 90 can be provided on one or more additional circuit boards). The pour spout control circuit has a first controller 92, such as a microcomputer, that includes analog to digital converters, input circuits, output circuits, and an internal memory 93 for storing a control program and data for use by the control program. In at least some embodiments, the control program is configured to operate the pour spout 12 consistent with the methods and operations described below. Data utilized by the control program can be stored in the memory 93 during a programming session, or can be entered as needed in some cases via a component of the dispensing system 10, such as the server interface 16, the cocktail pad 20, etc. The memory 93 stores a spout identifier that identifies the particular pour spout 12 where the memory 93 is installed. The spout identifier may be simply a unique number assigned to the particular pour spout 12 and/or may identify the specific beverage in the bottle to which the particular pour spout is attached. As an example of a spout identifier, the memory 93 has a first storage location that contains a designation of the brand of beverage and a second storage location that stores the particular type of beverage in the associated bottle. For example, the beverage brand may be "Johnnie Walker" and the type of beverage may be "Black Label Scotch Whiskey". In at least some embodiments, the beverage brand and the type of beverage may be designated by alphanumeric characters or by numerical values assigned to the brand and beverage type to encode them with less memory space utilized. Other types of designators have been contemplated. A third storage location within the pour spout memory 93 can contain a designation of the volume capacity of the bottle, i.e., the quantity of beverage when the bottle is full. A fourth storage location within the pour spout memory 93 might contain the quantity of beverage dispensed since the pour spout was placed (programmed) onto the bottle. A fifth storage location can be provided within the pour spout memory 93 which can contain the viscosity of the beverage contained within the bottle 14. A sixth storage location within the pour spout memory 93 might contain the profile of the bottle 14 as it relates to its shape and the effects of the same one the rate of flow given various depths of the liquid within the bottle 14. A seventh storage location within the pour spout memory 93 might contain the nominal flow rate of the beverage within the bottle. Numerous other storage locations within the pour spout memory 93 can be designated to store additional data. Alternatively, in another embodiment, the spout identifier may simply be a numerical value assigned to that pour spout, in which case the control unit 18 or server interface (16) stores a table which relates that numerical value to the brand, type of beverage, viscosity of beverage, bottle profile, nominal flow rate and volume capacity of the associated bottle. In addition, in at least some embodiments, one of or all of the spout identifier, the brand of beverage, the type of beverage, viscosity of beverage, bottle profile, the volume capacity of the bottle, and the quantity of beverage dispensed since the pour spout was placed onto the bottle, can be included in a single memory storage location or in two or more locations in the pour spout memory 93.

In at least some embodiments, the first controller 92 includes one or more input circuits (as noted above), which are configured to receive signals from various components, such as a temperature sensor 94 and a plurality of accelerometers 96 configured to detect motion along three orthogonal axes of the pour spout 12. The signal from the valve position sensor 84 can also be provided to one of the input circuits of the first controller 92. Using one or more output circuits, the first controller 92 is connected to a motor driver 95 that controls the motor 75 and is further coupled to a light emitter 99 (FIG. 6), such as a light emitting diode (LED), to provide an indication to the beverage server when the dispensing system 10 has selected the associated bottle for use. The pour spout 12 can include a plurality of light indicators 99 to annunciate to the beverage server information about the state of the pour spout 12. In at least some embodiments, the pour spout 12 includes four light indicators 99. The light indicators 99 can be positioned so as to be visible through an LED lens 87A (see FIG. 13).

The first controller 92 is connected, via one or more input circuits and output circuits, to a radio transceiver 98 that has an antenna 97, such as a Radio Frequency (RF) transceiver, for communicating with one or more components of the dispensing system 10, such as the server interface 16 (FIG. 1), as will be described. As used herein a radio transceiver is a device that includes a transmitter and a receiver. In at least some embodiments, a flow sensor could be incorporated to measure fluid flow through the pour spout 12 and further connected to the first controller 92. In such an embodiment, the amount of liquor being dispensed from the bottle 14 would be the measured variable in a closed loop servo control with a setpoint being a derived time period defining the dispensed volume of beverage. In such a closed loop servo system, servo control, such as provided by a Proportional Integral Derivative (aka PID) algorithm, or any subset of such, could be employed by the first controller 92 to control opening and closing of the spout valve 42.

Figure 7:
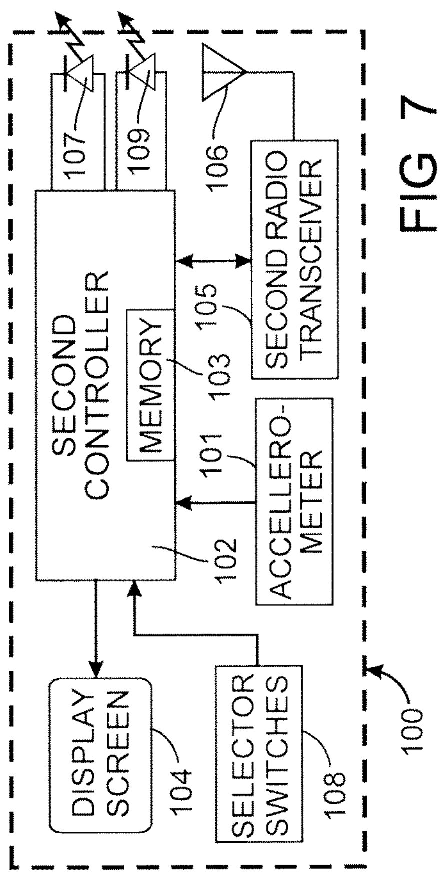
FIG. 7 is an exemplary block schematic diagram of a control circuit in a server interface that operates the pour spouts in a plurality of bottles.

With reference to FIG. 7, the server interface 16 has an interface control circuit 100 comprising a second controller 102, such as a microcomputer, that has input circuits and output circuits, and an internal memory 103 for storing a control program and data used by the control program. In at least some embodiments, the memory 103 also stores a unique identifier, such as a number or a person's name, assigned to that particular server interface 16 which serves to identify the beverage server to whom the interface is assigned. That unique identifier is referred to herein as the "server identifier." The server interface 16 can further include a plurality of selector switches, such as the selector switches 108. In at least some embodiments, four selector switches 108 are provided on the server interface 16. The selector switches 108 can be used to designate a server selectable portion of the beverage to be dispensed. More particularly, the buttons can be used to select one of a plurality of portions sizes, such as a small size portion, a regular size portion, a large size portion, or an extra-large size portion. A plurality of nominal pour time intervals (i.e., time periods) during which the spout valve 42 is to be in an open state to provide a selected portion size may be stored in a beverage data table, provided in the internal memory 103. The beverage data table can include an array of numbers associated with beverage types and pour times. The selector switches 108 can be actuated individually, sequentially, or simultaneously to initiate various unique functions or settings. In an alternate embodiment, the selector switches may be touch screen icons on the touch screen 21 acting as the GUI of the server interface 16.

In at least some embodiments, the server interface 16 includes at least one accelerometer 101, which provides an input signal to the second controller 102 to indicate when the beverage server rapidly moves the server interface 16. A display 104, such as a liquid crystal display, is provided on the server interface 16, with an output of the second controller 102 being connected thereto to drive the display 104. The display 104 communicates with the second controller 102 to provide information or selections to the server. Such information can include various selections and other information conveyed using alpha-numeric or other characters or indicia. One or more visual and/or audible indicators can be provided on the server interface 16, such as a pair of light emitters 107 and 109 (e.g., light emitting diodes), which are connected to outputs of the second controller 102 to provide visual indications of different operating conditions. In an alternate embodiment, a vibrating component could be utilized to alert the server wearing the interface that some action is necessary (e.g. a cocktail has been ordered by a food server). A second radio transceiver 105, with an antenna 106, is connected to an input/output circuit of the second controller 102. As shown in FIG. 7, the second radio transceiver 105 communicates with the pour spout 12 via the first radio frequency link 15 and with the control unit 18 via the second radio frequency link 17. This may be accomplished by using different radio frequencies for each link 15 or 17 or by sending different indicator codes in each transmitted message to designate whether the control unit 18 or a pour spout 12 is the intended message recipient. Instead of radio frequency links and radio transceivers other types of wireless communication signals, such as light beams, and transmission devices can be employed for wireless communication between various components of the beverage dispensing system. Further, as noted above, such communication can be accomplished via one or more of a plurality of transmission protocols (e.g., Spread-Spectrum Frequency Hopping, WiFi (802.11), Bluetooth, etc.).

Both the server interface 16 and the pour spout 12 are powered by one or more batteries, such as battery 88A (see FIG. 16) and may have a removable battery (e.g., rechargeable or disposable), or a battery that is hard wired to the control circuit 90 and which is inductively rechargeable at a central recharging station, which can be conveniently located in the tavern or restaurant where they are principally utilized. In at least some embodiments, an inductive charging coil 89A (see FIG. 16) is provided in the pour spout 12 to interface with an inductive charging station (not shown). The coil 89A is connected at least indirectly with the battery 88A (see FIG. 16), such as via the control circuit 90. To annunciate when the charge on the battery is at or below a certain level, the respective device can produce a visual or audible indication, or communicate the charge state via radio transmission to alert the control unit 18 of battery status.

In each control circuit 90 and 100, the controller, radio transceiver, and other components may be provided on a single integrated circuit, such as a model nRF51422 System on Chip (SoC) produced by Nordic Semiconductor ASA of Oslo, Norway. However, other commercially available Radio Frequency Systems on a Chip (RF SOC) such as the Texas Instruments RF SoC family or Chipcon family, Analog Device ADuCRF family, or Bluetooth 4 Low Energy (BLE) may also be used.

The dispensing system 10 can be configured to include a plurality of modes of operations. In at least some embodiments, the dispensing system 10 has two modes of operation, namely, (1) a direct pour mode in which the beverage server picks up a beverage bottle and begins pouring a drink, and (2) a cocktail mode in which the beverage server selects the desired mixed drink on the cocktail pad 20 and is guided by the dispensing system 10 in selecting different liquor ingredients to use in preparing the mixed drink.

Figure 8:
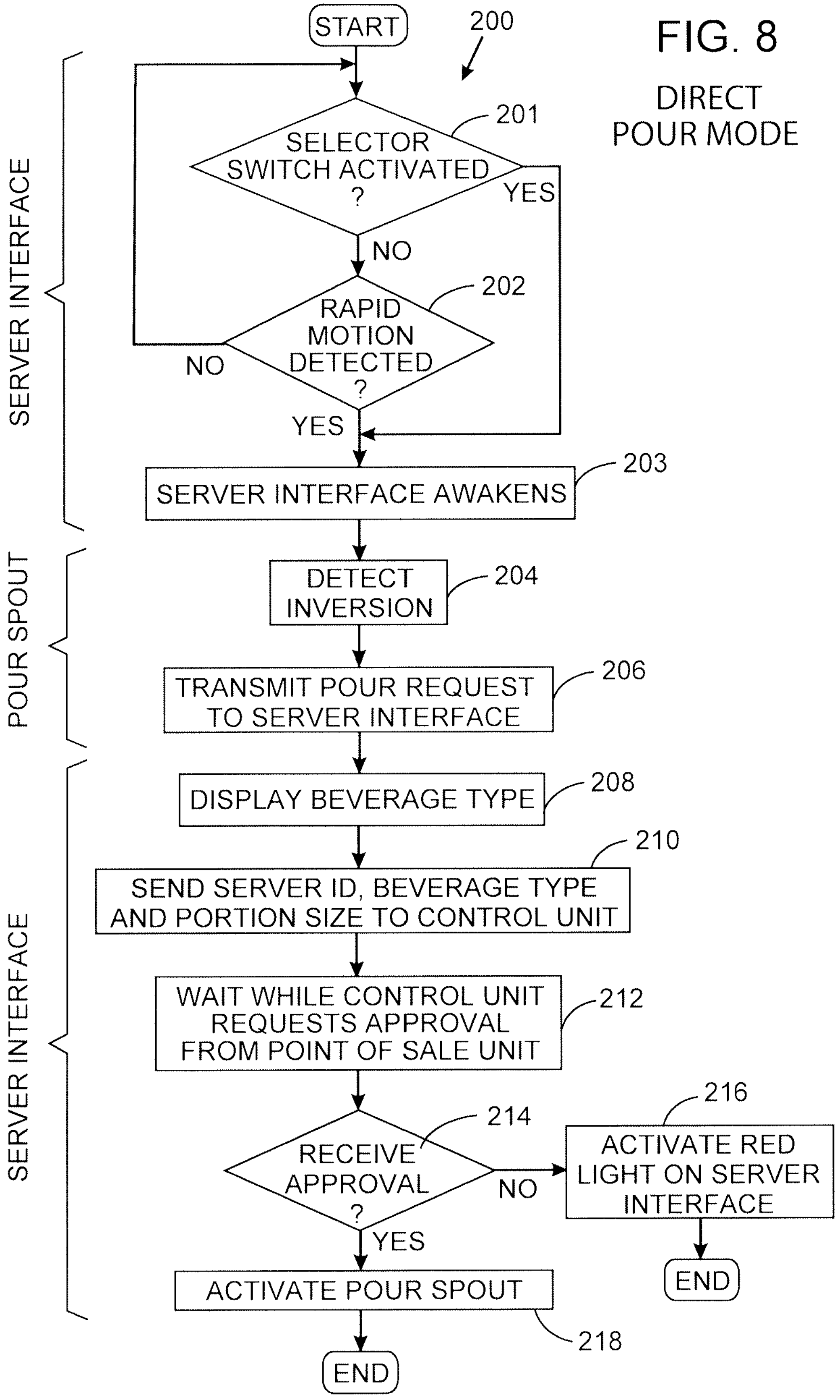
FIG. 8 is an exemplary flowchart of operation of the beverage dispensing system in a direct pour mode.

Various direct pour modes can be provided, although one embodiment of a direct pour mode is depicted by the exemplary flow chart 200 illustrated in FIG. 8, and will be described below with additional reference to other FIGS. (e.g., 1, 6, and 7). In this flow chart the server interface 16 is used to relay messages between the pour spout 12 and the control unit 18. Alternatively the pour spout 12 may communicate directly with the control unit 18, in which case the server interface 16 is used simply to add information to the pour request. With that said the description of the method depicted by the exemplary flow chart 200 continues as follows. The direct pour mode can be initiated in a plurality of ways, although in at least some embodiments, it is initiated by the beverage server pressing one of the drink size selector buttons 108 on the server interface 16, or by rapidly moving the server interface 16, where the movement is detected by the accelerometer 101. In at least some embodiments, movement of the server interface 16 to within a near horizontal angle, such as the server rotating the server interface 16 to an angle conducive to viewing the interface display screen 104 (e.g., parallel to a floor surface) can be used as a stimulus to initiate the direct pour mode. One or more of the aforesaid actions may be utilized to wake-up the server interface from a sleep state. During operation, the control program executed by the second controller 102 determines at step 201 whether one of the selector switches 108 has been actuated. Four selector switches 108 are used to denote whether a small, regular, large, or extra-large size portion of a selected beverage is desired to be dispensed. If activation of one of the selector switches 108 is detected, the program advances to step 203 at which the server interface 16 awakens and displays an indication of the selection on the display screen 104. If one of the selector switches 108 is not detected, the program advances to step 202 at which the second controller 102 inspects the signal from the accelerometer 101. That accelerometer signal indicates whether the beverage server has rapidly moved the server interface 16 in order to awaken it. In that case, direct pour mode defaults to the regular size portion and advances to step 203, although other sizes could be configured as the default. If such rapid motion is not detected at step 202, the program execution returns to step 201 and maintains a sleep state.

Assuming that the beverage server has awakened the server interface 16 and the execution has advanced to step 203, the beverage server then grabs the particular bottle 14 containing the beverage that is desired to be dispensed. That bottle then is inverted over the glass 11 or another receiving container. At step 204, the inversion of the bottle 14 is detected by accelerometers 96 in the pour spout 12 (e.g., three accelerometers-one for each axis, X, Y, Z), thereby providing one or more pour signals to the first controller 92 in FIG. 6. The first controller 92 responds by transmitting a pour request message via the first radio frequency link 15 at step 206. That request message may contain various pieces of information, including the spout identifier, which can be retrieved from the pour spout memory 93.

At step 208, upon receiving the pour request message, the server interface 16 extracts the name of the beverage from that message and presents the name on the display 104. Then at step 210, the second controller 102 accesses its memory 103 to obtain the server identifier for the person to whom the respective server interface 16 has been assigned. That server identifier, the spout identifier, and the desired portion size are transmitted as a beverage dispensing request via the second radio frequency link 17 to the control unit 18, and/or another component of the dispensing system 10. Thereafter, the software executed by the control program on the server interface 16 waits at step 212 for a response from the control unit 18 authorizing the dispensing of that particular beverage by the pour spout 12.

The receipt of the dispensing request causes the control unit 18 to obtain a price and volume stored in the memory of the control unit for the specified portion size of the designated beverage. The server identifier, type of beverage, and volume of the beverage, and the related price are then transmitted to the point of sale unit 22 for entry into the bill for the items being served to the associated customer. This information may be encoded in what is commonly referred to as a price look-up (PLU) number, although other types of encoding can be utilized. It should be understood that upon serving all the drinks ordered by that customer, the beverage server can print the bill at the point of sale unit 22. After the transaction has been entered, the point of sale unit 22 approves the dispensing transaction by sending an approval message to the control unit 18. In response to the approval message, the control unit 18 sends a request reply message with the volume to be dispensed via the second radio frequency link 17 to the server interface 16, which in effect approves the beverage dispensing request.

If a predefined amount of time has passed after sending a beverage dispensing request, where the server interface 16 has not received a request reply message from the control unit 18, the direct pour mode branches from step 214 to step 216. Alternatively, the server interface 16 may receive a reply message from the control unit 18 that expressly denies the beverage dispensing request. In either event, the server interface 16 concludes that the beverage dispensing was not approved. The second controller 102 activates the red light emitter 107 to indicate to the beverage server that the transaction has been denied. An alphanumeric or graphic message to that effect also may be presented on the display screen 104 of the server interface 16. The display screen 104 may be backlit to different selectable colors, or the server interface 16 may have a vibrating motor that is operated to indicate the denial to the person carrying the server interface. In addition, the sever interface 16 may utilize an audible annunciator, such as a speaker, to provide indications. Those indications remain active for a predefined period of time after which the direct pour mode 200 terminates without dispensing any beverage from the bottle 14.

Otherwise, upon receiving a request reply message indicating approval from the control unit 18 at step 214, the direct pour mode advances to step 218 at which the server interface 16 sends a dispensing command message via the second radio transceiver 105 to the respective pour spout 12. That dispensing command message contains the spout identifier that was previously received by the server interface 16 from the associated pour spout 12. The spout identifier indicates which pour spout at the serving station is to be activated and thus which pour spout is to receive and respond to this pour command message.

Various beverages have different viscosities, for example, gin and whiskey have a viscosity similar to that of water, while certain liqueurs have a greater viscosity and pour slower. Thus different beverages have different nominal flow rates which are used to calculate the pour time intervals during which to open the pour spout valve 42 in order to dispense the desired portion size of that beverage. In at least some embodiments, the appropriate nominal flow rates for a particular beverage may be stored either in the beverage data table, which can be located in the memory 93 of the associated pour spout 12, or in the control unit 18, that also stores the price and nominal volume data for that beverage. As price data can change for temporary periods (e.g., discounted happy hour times, special rates for private parties, etc.), the price data is typically stored in the control unit 18 or the point of sale unit 22, in at least some embodiments, the price data can be stored in another component of the dispensing system 10, or in another component that is in communication with the dispensing system 10. When the volume, optionally in the form of a nominal pour time interval, is stored in the control unit 18, the volume or nominal pour time interval to use is sent from the control unit 18 to the server interface 16 in the request reply message and then relayed to the pour spout 12 in the dispensing command message. Alternatively, the volume or nominal pour time interval to use can also be sent from the control unit 18 directly to the pour spout 12. In at least some embodiments, the volumes or nominal pour time intervals can be stored in a beverage data table in the memory 103 of the server interface 16.

The pour time intervals are noted as being "nominal" because the rate at which the beverage flows from the bottle is a factor of the beverage temperature, the angle at which the beverage server inverts the bottle, and the quantity of liquor remaining in the bottle. For some mixed drinks, a liquor ingredient, such as gin, may be refrigerated for a certain type of drink and thus be at a lower temperature than another bottle of the identical brand of gin that is not refrigerated for other types of drinks. Thus, the control circuit 90 for the pour spout 12 has a temperature sensor 94 that enables the first controller 92 to know the present temperature of the beverage. A first lookup table stored within memory 93 provides data defining how the pour time interval for the respective beverage is affected by temperature, thereby enabling the first controller 92 to adjust the nominal pour time for temperature variation. The accelerometers 96 also enable the first controller 92 to determine the pouring position of the bottle, such as the angle to which the beverage server has tilted the bottle for pouring. When the bottle is aligned vertically, the beverage flows from the pour spout 12 at a faster rate than when the bottle merely is tilted to a 45° angle with respect to vertical. A second lookup table stored within memory 93 provides data defining how the pour time interval for the respective beverage is affected by the bottle tilt angle, thereby enabling the first controller 92 to adjust the nominal pour time for tilt angle variation. The quantity of beverage remaining in the bottle also affects the actual pour time, i.e., the greater the quantity, the greater the fluid pressure and thus the greater the flow rate. Therefore, the first controller 92 uses the amount of beverage dispensed during each pour to track the quantity remaining in the bottle. A third lookup table within memory 93 provides data defining how the pour time interval is affected by the quantity of the beverage remaining in the bottle, thereby enabling the first controller 92 further to adjust the nominal pour time. The result of this processing is an adjusted pour time interval. In at least some embodiments, any one of or all of the first, second, and third lookup tables can be stored in another component of the dispensing system 10 and accessed as needed.

After the first controller 92 has received the information to provide a desired pour, the first controller 92 produces an output signal which activates the motor driver 95 which responds by energizing the motor 75, which rotates the cam plates 72 and 74 (FIGS. 2 and 4). The cam plates 72 and 74 push the actuating portions 66 and 67, thereby sliding in the valve carriage 48 within the housing 40. The motion of the valve carriage 48 moves the plunger 62 away from the valve seat 60 opening a path for the beverage to flow from the bottle out of the nozzle 44 and into the glass 11 or other container. The motor is de-energized when the valve is fully open to save battery power. The motor 75 and its gearbox provide sufficient resistance to hold the spout valve 42 open against the force of the compression spring 50. The first controller 92 has an internal timer that measures the amount of time during which the spout valve 42 is open and when the adjusted pour time interval expires, the motor 75 is reversed in direction. At that time, the compression spring 50 moves the valve carriage 48 until the plunger 62 once again engages the valve seat 60 closing the fluid path through the pour spout 12, terminating the flow of the beverage from the bottle 14. The motor can be de-energized when the valve is fully closed to save battery power.

On some occasions, the beverage server may make two or more identical drinks at the same time. In that situation, the beverage server, while holding the bottle 14 in the inverted position, shakes the bottle up and down rapidly, which motion is detected by the accelerometers 96 in the pour spout 12. In the direct pour mode, this rapid movement triggers the process to move to step 206, where the first controller 92 sends another pour request to the server interface 16. Eventually the direct pour mode 200 terminates with the beverage server placing the bottle in the normal upright position, which is sensed by the accelerometers 96 of the pour spout control circuit 90.

Figure 9:
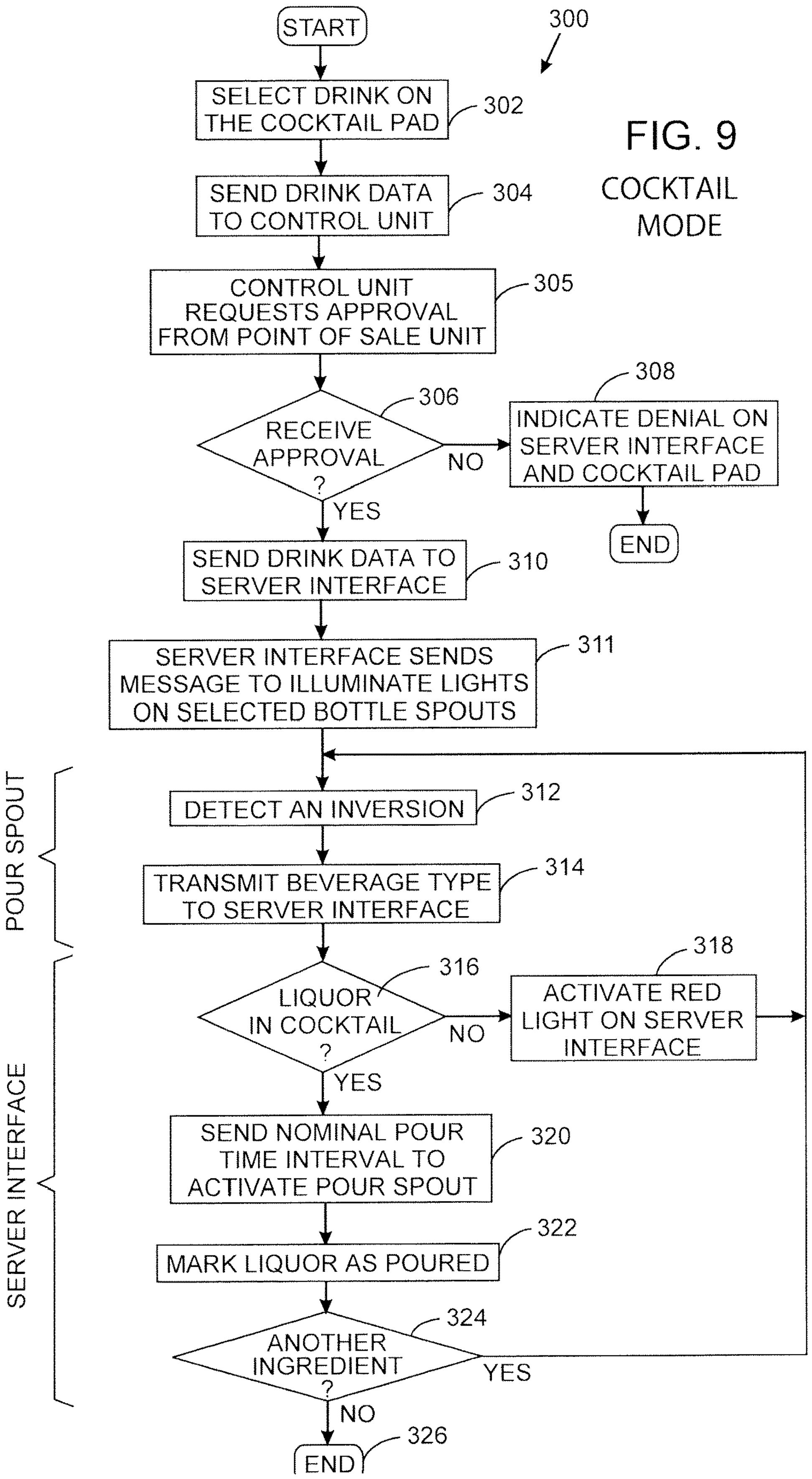
FIG. 9 is an exemplary flowchart of operation of the beverage dispensing system in a cocktail mode.

With reference to FIG. 9, the dispensing system 10 can be configured to operate in various types of cocktail modes, with one embodiment of a cocktail mode provided in exemplary flow chart 300. In this flow chart the server interface 16 is used to relay messages between the pour spout 12 and the control unit 18. Alternatively the pour spout 12 may communicate directly with the control unit 18, in which case the server interface 16 is used simply to add information to the pour request. With that said the description of the method depicted by the exemplary flow chat 300 continues as follows. In cocktail mode, the beverage server is guided through mixing several liquor ingredients to make a particular cocktail. To mix a cocktail in this mode, the beverage server selects the desired cocktail from a list presented on the touch screen 21 of the cocktail pad 20, or otherwise enters data to search for the cocktail from a database of cocktail recipes stored on the cocktail pad 20 or otherwise accessible by the cocktail pad 20. The cocktail mode commences with the beverage server signing into the cocktail pad 20. In at least some embodiments, the signing in can occur by entering an employee number or selecting the server's name from a list displayed on the touch screen 21. Then at step 302, the beverage server uses the touch screen 21 to scan the list of cocktails to locate the one that is desired and to select it. Typically the cocktail mode is used to prepare drinks that have a number of different liquor ingredients, for example, a Long Island Iced Tea contains vodka, tequila, rum, gin, and triple sec along with sweet and sour mix and a splash of cola.

A drink selection message, containing the beverage server's identifier, the name of the selected cocktail, the list of ingredients in that cocktail, and a volume or nominal pour time interval for each ingredient is communicated from the cocktail pad 20 to the control unit 18 at step 304. Upon receiving that message, the control unit looks up the price of the cocktail in a table stored in its memory. The control unit 18 then sends a transaction notice message containing the beverage server identifier, the cocktail name, and the price to the point of sale unit 22. The point of sale unit 22 adds that cocktail to a list of items on the bill for the customer being served. At step 306, the control unit waits for approval of the transaction, and if the transaction is approved, a reply message, which effectively authorizes the dispensing transaction, is sent back to the control unit 18. If a reply message is not received within a predefined amount of time (e.g., 5 seconds, 30 seconds, etc.) after sending the transaction notice message, the control unit 18 concludes that the transaction has been denied and the cocktail mode branches to step 308. Alternatively, the control unit 18 may receive a reply message from the point of sale unit 22 that expressly denies the beverage dispensing transaction. In either event, an indication of the denial is sent to and displayed on the cocktail pad 20 and the server interface 16 for the respective beverage server, before the cocktail mode ends.

Upon receiving an approval reply message from the point of sale unit 22, the cocktail mode moves from step 306 to step 310 at which the control unit 18 uses the server identifier to send a transaction message (e.g., via the second radio frequency link 17) to the server interface 16 that is assigned to the requesting beverage server. The transaction message contains the identity of the cocktail to be prepared, the list of liquor ingredients, and for each ingredient, both the spout identifier and designation of the nominal pour time interval. In at least some embodiments, when the server interface 16 receives a message containing the associated server identifier and an approval code for the cocktail mode, the data contained in that message is extracted and stored in the memory 103. At step 311, the server interface 16 sends a message to the pour spout 12 for each bottle 14 containing one of the liquor ingredients. Each of those messages, sent via the first radio frequency link 15, instructs the pour spout control circuit 90 in the respective spout to activate its light emitter 99 which visually identifies the associated liquor bottle among all the bottles at the serving station. In at least some embodiments, other means of identifying bottles can be provided.

Next at step 312, the cocktail mode waits for the server to grab one of the liquor bottles on the ingredient list. The inversion (e.g., tilting) of the bottle by the server is detected by the one or more accelerometers 96 in the attached pour spout 12, which causes the first controller 92 in the pour spout to send a wireless message to the server interface 16 at step 314. That message identifies the pour spout 12 and its associated liquor bottle to the server interface 16. At this point the pour spout 12 may send a pour request message to the control unit 18.

Then at step 316, the server interface 16, or the control unit 18, checks whether the liquor in the identified bottle is on the list of ingredients for the cocktail being mixed. If not, the process moves to step 318 at which a red light emitter on the server interface 16 is illuminated to indicate selection of an incorrect bottle by the server. The process then returns to step 312 to await selection of a proper bottle. If at step 316, the identified bottle was found to contain a liquor ingredient of the cocktail, the process moves to step 320. At that time, an activation message containing the volume or the nominal pour time interval for that liquor ingredient is sent wirelessly to the inverted pour spout 12. Once the designated pour spout 12 receives that activation message, the spout valve 42 opens for the designated nominal pour time interval.

As described previously with respect to the direct pour mode, the pour spout control circuit 90 also senses the temperature of the beverage in the bottle and the angle at which the bottle has been tilted (e.g., relative to vertical). The pour spout control circuit 90 keeps track of the quantity of liquor remaining in the bottle. Those three variable factors affect the rate at which fluid flows through the pour spout 12. Therefore, the first controller 92 uses the sensed temperature, the tilt angle and the remaining liquor quantity to adjust the nominal pour time interval, as received or as calculated given the volume and nominal flow rate, to ensure that the proper quantity of beverage is dispensed under those variable conditions. That action produces an adjusted pour time interval, which is used to control the duration of the open state of the spout valve 42.

The first controller 92 then operates the motor 75 to open the spout valve 42 and begins measuring the amount of time that the spout valve is held open. When that amount of time equals the adjusted pour time interval, the motor 75 is activated to close the valve. The first controller 92 then deactivates the light emitter 99 on the pour spout. Then at step 322, closure of the spout valve 42 is communicated by the first radio transceiver 98 via the first radio frequency link 15 to the server interface 16, or to the control unit 18, and the server interface 16 or the control unit 18 marks the liquor ingredient as having been poured. Then at step 324, the server interface 16 or the control unit 18 checks the cocktail ingredient list to determine if another ingredient remains to be poured. If there is another such ingredient, the cocktail mode returns to step 312 where the process waits for the server to invert another liquor bottle on the ingredient list for the selected cocktail. The process repeatedly loops through steps 312-324 until all the liquor ingredients have been poured to prepare the mixed drink, at which time the cocktail mode ends at step 326.

For certain cocktails, such as the Long Island Iced Tea, non-alcoholic beverages such as a carbonated soda or an ingredient that is not contained in a bottle may be utilized. The beverage dispensing system 10 can indicate those additional ingredients either via the cocktail pad 20 or the display 104 on the server interface 16.

The cocktail mode has been described in the context of the list of liquor ingredients and designations of the volume or nominal pour time interval for each ingredient of the selected mixed drink being transmitted to the server interface 16 in a single message from the control unit 18. The server interface 16 controls the sequential activation of each of the pour spouts 12 for the liquor ingredients. Alternatively, the control unit 18 can control dispensing each liquor ingredient and send separate dispensing messages to the server interface 16 or directly to the pour spout 12 for each liquor ingredient sequentially as each ingredient has been dispensed. Each such dispensing message contains the spout identifier associated with one liquor ingredient and the designation of the volume or nominal pour time interval for that liquor ingredient. Further, in at least some embodiments, the pour spout 12 can communicate directly with the control unit 18 to exchange at least some of the aforementioned information.

When a bottle houses a relatively sticky beverage, such as a cordial that is served infrequently, an associated spout valve can become stuck shut. The present dispensing system 10 can mitigate this problem by periodically exercising the spout valve 42 even though the beverage is not sought to be dispensed. The control unit 18 stores a list of spout identifiers for pour spouts that are susceptible to valve sticking. Periodically, such as once a week, the control unit 18 enters a valve exercise mode in which each of those spout identifiers is sequentially obtained from that list and used to send an exercise command either directly to the associated pour spout 12 or to the pour spout via a server interface 16 that is in use. Upon receiving the exercise command, the first controller 92 of the respective spout control circuit 90 determines the present position of the bottle, as stored previously based on signals from the accelerometers 96. If the bottle is in the upright position, i.e., the neck facing upward, the first controller 92 commands the motor driver 95 to energize the motor 75 and open the spout valve for a brief period of time, e.g., a fraction of a second.

Referring to FIGS. 10-21 (as described above), another exemplary pour spout 12A, used in at least some embodiments of the beverage dispensing system 10 is illustrated. It is to be understood that the pour spout 12A includes in at least some embodiments, components that perform the same or substantially the same functions and methods as the components described above with regard to the pour spout 12 and flow charts 200 and 300, with the components from the pour spout 12A being identified, for convenience, with the same number as the components of pour spout 12, but with an "A" added to the number (e.g., 14 and 14A). In at least some embodiments, various components of the pour spout 12A can be identical to the components of the pour spout 12, while other components can include some variance in size and function. Additionally, the pour spout 12A can include additional components not described that serve to assist with the functionality of the pour spout 12A. Further, two or more components identified with pour spout 12 can be combined to form a single component in pour spout 12A that performs the functions of the two or more components, or vice-versa. In at least some embodiments, some elements of the pour spout 12A identified in FIGS. 10-21 may not have corresponding numbers identified from the pour spout 12 illustrated in FIGS. 1-9, although the lack of a corresponding number should not be considered as a necessary exclusion of a corresponding element from pour spout 12, or vice versa.

It should be appreciated that the present disclosure is intended to encompass numerous embodiments as disclosed herein and further described by the following:

(i). A system for dispensing a beverage from a bottle comprising:

a pour spout adapted to be attached to a bottle and having a first transceiver for wireless communication, a first controller connected to the first transceiver, and a valve operated by the first controller to control flow of a beverage from the bottle through the spout in response to a first message received by the first transceiver;

a server interface adapted to be carried by a beverage server and comprising a second transceiver for communicating the first message; and a control unit for communicating with at least one of the second transceiver of the server interface and the first transceiver of the pour spout, wherein the first message is communicated to the pour spout either directly from the control unit as a pour command, or relayed by the server interface as a pour command.

(ii). The system (i), wherein the pour spout stores designations of a brand of beverage, a type of beverage, and a volume capacity of the bottle.

(iii). The system of any one of (i)-(ii), wherein the pour spout stores a spout identifier, and the spout identifier is communicated to at least one of the control unit and the server interface in response to initiating a beverage dispensing operation.

(iv). The system of any one of (i)-(iii), wherein upon receiving a spout identifier, at least one of the pour spout and the server interface communicates at least one of the spout identifier and server interface identifier to the control unit.

(v). The system of any one of (i)-(iv), wherein upon receiving a spout identifier, the control unit communicates to at least one of the pour spout and the server interface, a reply message authorizing or denying beverage dispensing.

(vi). The system of any one of (i)-(v), wherein the server interface incudes one or more components operable to provide indications to the beverage server carrying the server interface, wherein the one or more components include at least one of a display that is backlit to a plurality of selectable colors, an audible annunciator, and a vibrating motor.

(vii). The system of any one of (i)-(vi), wherein the server interface comprises an input device by which the beverage server designates a portion size of the beverage that is desired to be dispensed, thereby producing a portion size indication.

(viii). The system of any one of (i)-(vii), wherein the server interface communicates the portion size indication to the control unit.

(ix). The system of any one of (i)-(viii), wherein the portion size indication is used to derive a pour time interval that defines an amount of time that the pour spout is to open the valve.

(x). The system of any one of (i)-(ix), wherein the server interface stores a server identifier that identifies the beverage server, and wherein the server interface communicates the spout identifier to the control unit in response to initiating a beverage dispensing operation.

(xi). A method for dispensing a beverage from a bottle comprising:

communicating a dispensing authorization message from a control unit to at least one of a server interface that is being carried by a beverage server, and a pour spout secured to a bottle; wherein the dispensing authorization message at least one of includes or initiates a dispensing command, wherein the pour spout responds to the dispensing command by opening a spout valve through which a beverage flows from the bottle and out of the pour spout.

(xii). The method of (xi), further comprising the pour spout detecting motion of the bottle into a pouring position, wherein opening the spout valve is further in response to the bottle being in the pouring position.

(xiii). The method of any one of (xi)-(xii), wherein the dispensing command designates a nominal pour time interval; and the pour spout opens the spout valve for a period of time that is derived based at least in part on the nominal pour time interval, and wherein the control unit is stationary.

(xiv). The method of any one of (xi)-(xiii), further comprising sensing by the pour spout, a temperature of the beverage in the bottle; calculating an adjusted pour time interval from the nominal pour time interval in response to the temperature sensed; and opening the spout valve for a period of time equal to the adjusted pour time interval.

(xv). The method of any one of (xi)-(xiv), further comprising, sensing by the pour spout, an angle to which the bottle is tilted; in response to the angle sensed, deriving an adjusted pour time interval from the nominal pour time interval; and opening the spout valve for a period of time equal to the adjusted pour time interval.

(xvi). The method of any one of (xi)-(xv), further comprising periodically operating the spout valve, when the bottle is detected as being in a vertical position, without dispensing the beverage, to prevent or substantially prevent the valve from becoming stuck in a closed position.

(xvii). A method for dispensing a beverage from a bottle comprising:

sensing a beverage dispensing indication initiated by a beverage server;

in response to sensing a beverage dispensing indication, communicating a spout identifier from a pour spout attached to a bottle containing a beverage to be dispensed by the beverage server, to at least one of a control unit and a server interface;

communicating from at least one of the pour spout and server interface a request message to the control unit, wherein the request message contains a server identifier unique to that server interface;

the control unit responding to the request message by communicating to at least one of the pour spout and the server interface, authorization or denial for beverage dispensing, wherein if the authorization is transmitted to the server interface, the server interface communicates a dispensing command to the pour spout; and the pour spout responding to the dispensing command by opening a valve in the pour spout to allow beverage to flow from the bottle.

(xviii). The method of (xvii), wherein sensing a beverage dispensing indication comprises one of detecting motion of the pour spout and activating an input device by the beverage server.

(xix). The method of any one of (xvii)-(xviii), wherein a spout identifier comprises designations of a brand of beverage, a type of beverage, and a volume capacity of the bottle.

(xx). The method of any one of (xvii)-(xix), further comprising the server interface visually displaying a name of the beverage.

(xxi). The method of any one of (xvii)-(xx), wherein the dispensing command designates a nominal pour time; and the pour spout opens the valve for a period of time that is derived from the nominal pour time.

(xxii). The method of any one of (xvii)-(xxi), wherein the pour spout senses at least one of a temperature value, a bottle tilt angle value, and a volume of liquor in the bottle to which the pour spout is attached and derives an adjusted pour time from the nominal pour time; and opens the valve for the adjusted pour time.

(xxiii). A method for dispensing beverages in bottles comprising:

a beverage server selecting a cocktail via a user input device;

in response to the cocktail that was selected, obtaining a designation of a plurality of liquor ingredients from an electronic memory in the user input device and communicating the plurality of liquor ingredients to a control unit;

communicating the designation of the plurality of liquor ingredients from the control unit to a server interface carried by the beverage server;

sequentially for each of the plurality of liquor ingredients, the server interface communicating a dispensing command to a given pour spout attached to a bottle containing a respective liquor ingredient of the plurality of liquor ingredients; and the given pour spout responding to the dispensing command by opening a valve through which the respective liquor ingredient flows from the bottle.

(xxiv). The method of (xxiii), further comprising the pour spout communicating a signal to the server interface to indicate completion of pouring the respective liquor ingredient.

(xxv). The method of any one of (xxiii)-(xxiv), further comprising the pour spout detecting the beverage server holding the bottle to which the pour spout is attached and in response sending a message to the server interface, wherein the server interface responds to the message by communicating the dispensing command.

(xxvi). The method of any one of xxiii)-(xxv), further comprising assigning a unique spout identifier in each pour spout; and wherein each dispensing command contains the spout identifier of the pour spout attached to the bottle that contains the respective liquor ingredient.

(xxvii). The method of any one of xxiii)-(xxvi), further comprising when a dispensing command is transmitted, the server interface visually displaying a name of the respective liquor ingredient.

(xxviii). The method of any one of (xxiii)-(xxvii), wherein each dispensing command designates a volume of liquor or nominal pour time; and the respective pour spout opens the valve for a period of time that is derived from the volume of liquor or nominal pour time.

(xxix). The method of any one of (xxiii)-(xxviii), wherein the pour spout responds to at least one of a temperature value, a bottle tilt angle value, and a liquor quantity in the bottle to which the pour spout is attached by deriving an adjusted pour time from the nominal pour time; and opens the valve for the adjusted pour time.

(xxx). A pour spout for dispensing a beverage from a bottle, the pour spout comprising:

a bottle adapter for attaching to a bottle to receive a beverage from the bottle;

a housing having a chamber into which a housing inlet and a housing outlet open, the housing inlet connected to the bottle adapter for receiving the beverage;

a valve carriage moveably received within the chamber and having a carriage passage;

a resilient first tube providing a first passageway for beverage to flow from the housing inlet to the carriage passage;

a resilient second tube providing a second passageway for beverage to flow from the carriage passage to the housing outlet;

a valve operatively connected to the valve carriage to control flow of the beverage through the housing from the housing inlet to the housing outlet; and a valve actuator for moving the valve carriage within the chamber to operate the valve between an open state and a closed state.

(xxxi). The pour spout of (xxx), further comprising a compression spring that biases the valve carriage toward closing the valve.

(xxxii). The pour spout of any one of (xxx)-(xxxi), wherein the first tube and the second tube expand and contract longitudinally as the valve carriage moves within the chamber.

(xxxiii). The pour spout of any one of (xxx)-(xxxii), wherein the first tube and the second tube each has at least one pleat.

(xxxiv). The pour spout of any one of (xxx)-(xxxiii), wherein the valve comprises a valve seat formed in one of the first tube and the second tube; and a plunger attached to the valve carriage.

(xxxv). The pour spout of any one of (xxx)-(xxxiv), wherein the valve actuator comprises a motor operatively connected to move the valve carriage.

(xxxvi). The pour spout of any one of (xxx)-(xxxv), wherein the valve actuator comprises a motor with a shaft, and a cam plate attached to the shaft and engaged with an actuating portion of the valve carriage.

(xxxvii). The pour spout of any one of (xxx)-(xxxvi), further comprising a control circuit that has a receiver configured to receive a wireless signal requesting a valve actuation, and where the control circuit is further configured to operate the valve actuator in response to receiving the wireless signal.

(xxxviii). The pour spout of any one of (xxx)-(xxxvii), further comprising a control circuit that includes a temperature sensor, wherein the control circuit operates the valve actuator to open the valve for a period of time that is determined, at least in part, in response to the temperature sensed by the temperature sensor.

(xxxix). The pour spout of any one of (xxx)-(xxxviii), further comprising a control circuit that determines an angle to which the bottle has been tilted and operates the valve actuator to open the valve for a period of time that is determined, at least in part, in response to the determined angle.

(xl). The pour spout of any one of (xxx)-(xxxix), further comprising an accelerometer that produces a signal from which the control circuit determines the angle.

(xli). The pour spout of any one of (xxx)-(xl), wherein at least one of the first tube and the second tube are contoured to allow for compression in length, without generating a substantial restriction therethrough.

(xlii). A pour spout for dispensing a beverage from a bottle, the pour spout comprising:

a bottle adapter for insertion into a bottle to receive a beverage;

a housing having a chamber into which a housing inlet and a housing outlet open, the housing inlet connected to the bottle adapter for receiving the beverage;

a valve carriage moveably received within the chamber and having a carriage inlet and a carriage outlet, the carriage outlet in fluid communication with the carriage inlet;

a first tube attached to the housing and the valve carriage to provide a first passageway for beverage to flow from the housing inlet to the carriage inlet;

a second tube attached to the housing and the valve carriage to provide a second passageway for beverage to flow from the carriage outlet to the housing outlet;

wherein one of the first tube and the second tube has a valve seat, and wherein the valve carriage has a plunger that selectively engages and disengages the valve seat as the valve carriage moves within the chamber; and a valve actuator for moving the valve carriage within the chamber in response to a control signal, thereby operating the valve between an open state and a closed state.

(xliii). The pour spout of (xlii), further comprising a compression spring biasing the valve carriage toward the valve seat.

(xliv). The pour spout of any one of (xlii)-(xliii), wherein the first tube and the second tube expand and contract longitudinally as the valve carriage moves within the chamber.

(xlv). The pour spout of any one of (xlii)-(xliv), wherein the first tube and the second tube each has at least one pleat.

(xlvi). The pour spout of any one of (xlii)-(xlv), wherein the valve actuator comprises a motor with a shaft, and a cam plate attached to the shaft and engaging an actuating portion of the valve carriage.

(xlvii). The pour spout of any one of (xlii)-(xlvi), further comprising a control circuit having a receiver configured to receive a wireless signal requesting a valve actuation, and where the control circuit is further configured to operate the valve actuator in response to receiving the wireless signal.

(xlviii). The pour spout of any one of (xlii)-(xlvii), further comprising a control circuit that includes a temperature sensor, wherein the control circuit operates the valve actuator to open the valve for a period of time that is determined, at least in part, on the temperature sensed by the temperature sensor.

(xlix). The pour spout of any one of (xlii)-(xlviii), further comprising a control circuit that determines an angle to which the bottle has been tilted and wherein the control circuit operates the valve actuator to open the valve for a period of time that is determined, at least in part, in response to the determined angle.

(l). The pour spout of any one of (xlii)-(xlix), further comprising an accelerometer that produces a signal from which the control circuit determines the angle.

(li). The pour spout of any one of (xlii)-(l), further comprising an accelerometer that produces a signal communicated to the control circuit to provide an indication of motion of the bottle.

(lii). The pour spout of any one of (xlii)-(li), wherein at least one of the first tube and the second tube are contoured to allow for compression in length, without generating a substantial restriction therethrough.

(liii). A pour spout for dispensing a beverage from a bottle, the pour spout comprising: a bottle adapter for attaching to a bottle to receive a beverage from the bottle; a housing having a chamber into which a housing inlet and a housing outlet open, the housing inlet connected to the bottle adapter for receiving the beverage; a valve carriage moveably received within the chamber and having a carriage passage;

a resilient first tube providing a first passageway for beverage to flow from the housing inlet to the carriage passage;

a resilient second tube providing a second passageway for beverage to flow from the carriage passage to the housing outlet;

a valve operatively connected to the valve carriage to control flow of the beverage through the housing from the housing inlet to the housing outlet;

a valve actuator for moving the valve carriage within the chamber to operate the valve between an open state and a closed state;

a control circuit having a receiver adapted to receive a wireless signal requesting valve actuation, and wherein the control circuit is further adapted to operate the valve actuator to an open state in response to receiving the wireless signal; and an accelerometer that produces a signal from which the control circuit determines an angle to which the bottle has been tilted and wherein the control circuit operates the valve actuator to actuate the valve to an open state for a period of time that is determined, at least in part, in response to the determined angle.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure. In addition, while the principles of the system and method of use for dispensing liquids from a container have been described above in connection with regard to one or more embodiments, it is to be clearly understood that this description is made only by way of example and not as a limitation on the scope of the system and method of use. It is specifically intended that the system and method of use for dispensing liquids from a container not be limited to the embodiments and illustrations contained herein, but include modified forms of those embodiments including portions of the embodiments and combinations of elements of different embodiments as come within the scope of the following claims. In addition, the various methods of use described herein can include additional steps not described herein or can omit steps described herein. Further, the various steps can be performed in a different order than described herein.

The invention claimed is:

1. A system for dispensing a beverage from a bottle comprising:

a control unit for communicating with at least one of a first transceiver and a second transceiver;

a pour spout adapted to be attached to a bottle and having the first transceiver for wireless communication, a first controller connected to the first transceiver, and a valve operated by the first controller to control flow of a beverage from the bottle through the spout, wherein the pour spout is controlled by messages received from the control unit, and wherein the pour spout opens to allow a pour in response to a first message received by the first transceiver, the second transceiver for communicating the first message, wherein the first message is communicated to the pour spout either directly from the control unit as a pour command, or relayed by a server interface as a pour command;

and wherein the control unit is in communication with a point of sale unit.

2. The system of claim 1, wherein the pour spout stores designations of a brand of the beverage in the bottle, a type of alcohol of the beverage in the bottle, and a volume capacity of the bottle.

3. The system of claim 1, wherein the pour spout stores a spout identifier, and the spout identifier is communicated to at least one of the control unit and the server interface in response to initiating a beverage dispensing operation.

4. The system of claim 3, wherein upon receiving a spout identifier, at least one of the pour spout and the server interface communicates at least one of the spout identifier and a server interface identifier to the control unit.

5. The system of claim 4, wherein upon receiving a spout identifier, the control unit communicates to at least one of the pour spout and the server interface, a reply message authorizing or denying beverage dispensing.

6. The system of claim 1, wherein the server interface incudes one or more components operable to provide indications to a beverage server carrying the server interface, wherein the one or more components include at least one of a display that is backlit to a plurality of selectable colors, an audible annunciator, and a vibrating motor.

7. The system of claim 1, wherein the server interface comprises an input device by which a beverage server designates a portion size of the beverage that is desired to be dispensed, thereby producing a portion size indication.

8. The system of claim 7, wherein the server interface communicates the portion size indication to the control unit.

9. The system of claim 1, wherein a portion size indication is used to derive a pour time interval that defines an amount of time that the pour spout is to open the valve.

10. The system of claim 1, wherein the pour spout includes a printed circuit board.

11. A method for dispensing a beverage from a bottle comprising:

receiving a beverage dispensing indication;

in response to receiving the beverage dispensing indication, communicating a spout identifier from a pour spout attached to a bottle containing a beverage to be dispensed, to at least one of a control unit and a server interface;

communicating from at least one of the pour spout and the server interface a request message to the control unit;

the control unit responding to the request message by communicating to at least one of the pour spout and the server interface, authorization or denial for beverage dispensing;

communicating a dispensing command to the pour spout if authorization is communicated;

the pour spout responding to the dispensing command by opening a valve in the pour spout to allow the beverage to flow from the bottle; and communicating to a point of sale unit the beverage dispensed.

12. The method of claim 11, wherein receiving a beverage dispensing indication comprises one of detecting motion of the pour spout and activating an input device by a beverage server.

13. The method of claim 11, wherein a spout identifier comprises designations of a brand of the beverage in the bottle, a type of alcohol of the beverage in the bottle, and a volume capacity of the bottle.

14. The method of claim 11, further comprising the server interface visually displaying a name of the beverage.

15. The method of claim 11, wherein the dispensing command designates a nominal pour time; and the pour spout opens the valve for a period of time that is derived from the nominal pour time.

16. The method of claim 15, wherein the pour spout senses at least one of a temperature value, a bottle tilt angle value, and a volume of liquor in the bottle to which the pour spout is attached and derives an adjusted pour time from the nominal pour time; and opens the valve for the adjusted pour time.

17. A method for dispensing beverages in bottles comprising:

selecting a cocktail via a user input device;

in response to the cocktail that was selected, obtaining a designation of a plurality of liquor ingredients from an electronic memory in the user input device and communicating the plurality of liquor ingredients to a control unit;

communicating the designation of the plurality of liquor ingredients from the control unit to a user interface;

sequentially for each of the plurality of liquor ingredients, the user interface communicating a dispensing command to a given pour spout attached to a bottle containing a respective liquor ingredient of the plurality of liquor ingredients; and the given pour spout responding to the dispensing command by opening a valve through which the respective liquor ingredient flows from the bottle.

18. The method of claim 17, further comprising the pour spout communicating a signal to the server interface to indicate completion of pouring the respective liquor ingredient.

19. The method of claim 17, further comprising assigning a unique spout identifier in each pour spout; and wherein each dispensing command contains the spout identifier of the pour spout attached to the bottle that contains the respective liquor ingredient.

20. The method of claim 17, wherein each dispensing command designates a volume of liquor or nominal pour time; and the respective pour spout opens the valve for a period of time that is derived from the volume of liquor or nominal pour time.

* * * * *